United States Patent
Yu et al.

(10) Patent No.: US 10,476,544 B2
(45) Date of Patent: Nov. 12, 2019

(54) SIGNAL TRANSMISSION AND RECEIVING METHOD, SYSTEM AND APPARATUS BASED ON FILTER BANK

(71) Applicant: Samsung Electronics Co., Ltd, Suwon-si (KR)

(72) Inventors: Bin Yu, Beijing (CN); Dalin Zhu, Beijing (CN); Pengfei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/994,021

(22) Filed: Jan. 12, 2016

(65) Prior Publication Data

US 2016/0204822 A1 Jul. 14, 2016

(30) Foreign Application Priority Data

Jan. 12, 2015 (CN) .......................... 2015 1 0015090
Feb. 15, 2015 (CN) .......................... 2015 1 0083155

(51) Int. Cl.
*H04B 1/38* (2015.01)
*H04L 5/16* (2006.01)
(Continued)

(52) U.S. Cl.
CPC ............. *H04B 1/40* (2013.01); *H04B 1/1036* (2013.01); *H04B 1/7101* (2013.01); *H04L 25/03343* (2013.01); *H04L 27/264* (2013.01)

(58) Field of Classification Search
None
See application file for complete search history.

(56) References Cited

U.S. PATENT DOCUMENTS 6,741,551 B1 5/2004 Cherubini
2004/0252772 A1 12/2004 Renfors et al.
(Continued)

FOREIGN PATENT DOCUMENTS

CN 1732659 A 2/2006
CN 1764174 A 4/2006
(Continued)

OTHER PUBLICATIONS

International Search Report dated Apr. 21, 2016 in connection with International Application No. PCT/KR2016/000278, 3 pages.
(Continued)

*Primary Examiner* — Shuwang Liu
*Assistant Examiner* — Gina McKie

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). A signal transmission method based on a filter bank, includes obtaining by a transmitter pre-equalization information, wherein the pre-equalization configuration information indicates whether pre-equalization is enabled, if the pre-equalization configuration information indicates that the pre-equalization is enabled, generating by the transmitter pre-equalization coefficients according to a pre-equalization manner, and performing pre-equalization operation to transmission signals according to the pre-equalization coefficients, and performing modulation based on the filter bank.

21 Claims, 8 Drawing Sheets

(51) Int. Cl.
  *H04B 1/40* (2015.01)
  *H04B 1/71* (2011.01)
  *H04B 1/10* (2006.01)
  *H04L 25/03* (2006.01)
  *H04L 27/26* (2006.01)

(56) References Cited

U.S. PATENT DOCUMENTS

| | | | |
|---|---|---|---|
| 2005/0201483 A1* | 9/2005 | Coersmeier | H04L 1/06 375/285 |
| 2006/0067394 A1 | 3/2006 | Chen | |
| 2006/0072514 A1* | 4/2006 | Kent | H04B 7/0413 370/335 |
| 2006/0088091 A1 | 4/2006 | Jeon et al. | |
| 2007/0071070 A1 | 3/2007 | Dominique et al. | |
| 2009/0060016 A1 | 3/2009 | Liu | |
| 2010/0027608 A1* | 2/2010 | Priotti | H04L 25/03866 375/232 |
| 2010/0183054 A1* | 7/2010 | Daly | H04L 25/03006 375/219 |
| 2010/0302977 A1* | 12/2010 | Phan Huy | H04B 7/0619 370/281 |
| 2010/0303472 A1* | 12/2010 | Miller | H01S 5/06832 398/195 |
| 2013/0022090 A1* | 1/2013 | Weng | H04L 25/03343 375/219 |
| 2013/0051442 A1 | 2/2013 | Cooper et al. | |
| 2014/0241409 A1 | 8/2014 | Wolcott et al. | |
| 2015/0139293 A1* | 5/2015 | Stanwood | H04L 27/01 375/230 |
| 2015/0288544 A1* | 10/2015 | Al-Banna | H04L 25/03057 375/231 |
| 2016/0043835 A1* | 2/2016 | Hadani | H04L 5/0016 375/146 |

FOREIGN PATENT DOCUMENTS

| | | |
|---|---|---|
| CN | 101242368 A | 8/2008 |
| CN | 101378380 A | 3/2009 |
| CN | 101536444 A | 9/2009 |
| CN | 101743729 A | 6/2010 |
| EP | 1207662 A1 | 5/2002 |
| GB | 2362077 B | 4/2004 |
| WO | WO 2004/008490 A2 | 1/2004 |

OTHER PUBLICATIONS

Written Opinion of the International Searching Authority dated Apr. 21, 2016 in connection with International Application No. PCT/KR2016/000278, 7 pages.

Pierre Siohan et al., "Analysis and Design of OFDM/OQAM systems based on filter bank theory"; IEEE Transactions on Signal Processing; vol. 50, No. 5; May 2002; pp. 1170-1183.

China National Intellectual Property Administration, "The First Office Action," Application No. CN201510083155.0, dated Jun. 3, 2019, 16 pages.

* cited by examiner

SIGNAL TRANSMISSION AND RECEIVING METHOD, SYSTEM AND APPARATUS BASED ON FILTER BANK

CROSS-REFERENCE TO RELATED APPLICATIONS AND CLAIM OF PRIORITY

The present application is related to and claims benefit under 35 U.S.C. § 119(a) of China patent application No. 201510015090.6 filed in the State Intellectual Property Office of the People's Republic of China on Jan. 12, 2015, and China patent application No. 201510083155.0 filed in the State Intellectual Property Office of the People's Republic of China on Feb. 15, 2015, the entire disclosures of which are incorporated herein by reference.

TECHNICAL FIELD

The present invention relates to radio communication techniques, and more particularly, to a signal transmission and receiving method, system and apparatus based on filter bank.

BACKGROUND

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

With rapid development of information industry, especially increasing requirements from mobile Internet and Internet of things (IoT), mobile communication techniques are facing unprecedented challenges. According to International Telecommunication Union (ITU) report ITU-R M.[IMT.BEYOND 2020.TRAFFIC], it can be predicted that as of 2020, mobile service amount will increase 1000 times compared with 2010 (4G era), and the connected user devices will exceed 17 billion. With involvement of IoT devices into the mobile communication networks, the number of connected user devices may be more astonishing. Under the unprecedented challenges, communication industry and the academia have started intensive researches in fifth generation mobile communication techniques (5G) facing 2020. At present, architecture and global objective of future 5G have been discussed in the ITU report ITU-R M.[IMT.VISION], which provides detailed description to requirement prospect, application scenarios and various important performances of 5G. With respect to new requirement of 5G, the ITU report ITU-R M.[IMT.FUTURE TECHNOLOGY TRENDS] provides information related to technology trends of 5G, aims to solve dramatic problems such as system throughput, user experience consistency, extendibility, supporting IoT, tendency, efficient, cost, network flexibility, supporting of new services and flexible spectrum utilization.

Modulation waveform and multiplexing manner are important basis for air-interface design of radio communications, and there is no exception for 5G. At present, a typical representation Orthogonal Frequency Division Multiplexing (OFDM) of multi-carrier modulation (MCM) techniques has been widely used in broadcast audio and video fields and civil communication systems, e.g., Long Term Evolution (LTE®) system corresponding to the Evolved Universal Terrestrial Radio Access (E-UTRA®) protocol defined by 3rd Generation Partnership Project (3GPP®), European digital video broadcasting (DVB) and Digital Audio Broadcasting (DAB), Very-high-bit-rate Digital Subscriber Loop (VDSL), IEEE 802.11a/g Wireless Local Area (WLAN)®, IEEE 802.22 Wireless Regional Area Network (WRAN) and IEEE 802.16 world interoperability for microwave access (WIMAX®), etc. It is well-known that, basic idea of OFDM technique is to divide wideband channel into multiple parallel narrow-band sub-channels/subcarriers, such that high rate data stream transmitted in frequency selective channel becomes low rate data streams transmitted on multiple parallel flat sub-channels, which improves anti-multipath interference ability of the system, and OFDM may simplify implementation of modulation and de-modulation via IFFT/FFT. Further, the addition of a Cyclic Prefix (CP) changes a cyclic convolution into a circle convolution. According to performance of the circle convolution, if the CP length is larger than the maximum channel multipath delay, Inter-Symbol Interference (ISI) may be avoided through simple single-tap frequency domain equalization. Thus processing complexity of the receiver is decreased. Although modulated waveform based on CP-OFDM is able to meet service requirement of Mobile Broadband (MBB) well, 5G faces more challenges and more various scenarios, CP-OFDM has much limitations and shortcomings in 5G scenarios which mainly include the following.

(1) In a low delay transmission scenario of 5G, the adding of the CP to resist ISI greatly decreases spectrum utilization ratio, since the low delay transmission extremely shortens the length of OFDM symbol and the length of the CP is merely subject to the channel impulse response, compared with the length of the OFDM symbol, the length of the CP greatly increases. Such overhead leads to high spectrum efficiency loss and is hard to be accepted.

(2) In an IoT scenario of 5G, rigid time synchronization requirement results in large signaling overhead for maintaining close-loop synchronization. And the rigid synchronization scheme makes the frame structure inflexible, which cannot support different synchronization requirements of different services.

(3) OFDM has a large out-of-band leakage due to the utilization of rectangular pulse, since such waveform makes side lobe attenuates very slow, which is also the reason why OFDM is very sensitive to central frequency offset. However, 5G may have many fragmented spectrum flexible access/sharing requirements, the out-of-band leakage of OFDM greatly restricts the flexibility of spectrum access, i.e., requires a wide frequency-domain guard band, thus the spectrum utilization ratio is decreased.

These defects are caused by its inherent characteristics. Although actions may be taken to reduce impacts caused by the defects, system design complexity may be increased and the problem cannot be solved essentially.

Due to the above, as stated in ITU report ITU-R M.[IMT. FUTURE TECHNOLOGY TRENDS], some new waveform modulation techniques (based on multi-carrier modulation) are in consideration of 5G. Among them, Filter Bank Multiple Carrier (FBMC) modulation technique is a hotspot. It provides freedom for the design of prototype filter and may adopt filters with better Time/Frequency Localization (TFL) to perform impulse forming to the transmitted waveform, such that the transmitted signal may exhibit various excellent features including: not requiring CP to resist ISI which improves spectrum efficiency, low out-of-band leakage which supports flexible fragmented spectrum access better, and non-sensitive to frequency offset. Usually, a typical FBMC system adopts an Offset Quadrature Amplitude Modulation (OQAM) technique to maximize the spectrum efficiency, generally referred to as FBMC/OQAM system, or OFDM/OQAM system. Reference may be made to a prior document "Analysis and design of OFDM/OQAM systems based on filter bank theory", IEEE Transactions on Signal Processing, Vol. 50, No. 5, 2002 for applications of FBMC in digital communications.

FBMC has some advantages that OFDM does not have and therefore receives much attention in 5G researches. But some inherent defects of it bring challenges to its application in radio communication system. The challenges need to be solved are researched continuously. One dramatic problem is that the filter adopted by FBMC results in a long tail effect to time domain waveform, also referred to transition period problem. During uplink transmission based on short data blocks, if the length of the data blocks is extended to include the tail in order to avoid overlapping of the tail with other data blocks, the number of symbols transmitted in valid time period is reduced, which greatly decreases spectrum efficiency. Therefore there is an idea that FBMC is merely applicable for long data transmission. On the contrary, if the length of the data block does not include the tail, which means the tail will overlap with other data blocks which may cause large interference if not better processed and thereby also restricting the spectrum efficiency. A present method cuts off the tail, so as to avoid overlapping of the tail with other data blocks. But the cutoff of the waveform leads to signal distortion which also affects the spectrum efficiency. In addition, the cut-off signal has a spread spectrum which increases Inter-Carrier-Interference (ICI). Therefore, such cutoff method is not effective.

In view of the above, in order to make FBMC more competitive in 5G candidate techniques, besides utilizing and developing its advantages, we also need to overcome its shortcomings. With respect to the service mode of sporadic access in 5G especially IoT scenarios, it is necessary to find an effective method to solve the tail effect of FBMC.

SUMMARY

To address the above-discussed deficiencies, it is a primary object to provide, for use in a communication system based on filter bank and a signaling transmission and receiving method thereof, which provides an effective configurable pre-equalization processing, ensures performance without cutting off the tail and maximizes spectrum efficiency of the FBMC system.

The present disclosure provides a signal transmission method based on filter bank, including obtaining, by a transmitter, pre-equalization information, wherein the pre-equalization configuration information indicates whether pre-equalization is enabled, if the pre-equalization configuration information indicates that the pre-equalization is enabled, generating by the transmitter pre-equalization coefficients according to a pre-equalization manner, and performing pre-equalization operation to transmission signals according to the pre-equalization coefficients, and performing modulation based on filter bank.

Preferably, the pre-equalization configuration information is contained in scheduling control signaling obtained by the transmitter.

Preferably, the method further includes obtaining, by the transmitter from the scheduling control signaling, information of subframe type adopted when the pre-equalization is enabled or disabled, wherein the information of subframe type indicates number of symbols transmitted in a subframe and transmission timing of a first symbol.

Preferably, the pre-equalization manner is pre-defined or an indication of the pre-equalization manner is contained in the pre-equalization configuration information.

Preferably, the pre-equalization manner comprises: performing pre-equalization to both amplitude and phase, or performing pre-equalization to merely the phase.

Preferably, if the pre-equalization manner is performing pre-equalization to both amplitude and phase, the generating the pre-equalization coefficients according to the pre-equalization manner comprises: generating the pre-equalization coefficients according to obtained channel status information and the pre-equalization manner, wherein a composited equivalent channel frequency response of the pre-equalization coefficients and a channel frequency response is a real number or has an imaginary part approaches to 0, and modulus of the equivalent channel frequency response is approximate to 1.

Preferably, if the pre-equalization manner is performing pre-equalization to merely the phase, the generating the pre-equalization coefficients according to the pre-equalization manner comprises: generating the pre-equalization coefficients according to obtained channel status information and the pre-equalization manner, wherein a composited equivalent channel frequency response of the pre-equalization coefficients and a channel frequency response is a real number or has an imaginary part approaches to 0, and modulus of the equivalent channel frequency response is approximate to modulus of the channel frequency response.

Preferably, the channel status information is obtained through channel reciprocity.

Preferably, if the pre-equalization manner comprises performing pre-equalization to merely the phase, the generating the pre-equalization coefficients according to the pre-equalization manner comprises: obtaining a phase indicator according to a feedback from a receiver, and generating the pre-equalization coefficients according to the obtained phase indicator.

Preferably, the transmitter obtains quantified phase information of channel frequency response according to the phase indicator, generates frequency phase response coefficients on an allocated bandwidth according to the phase information and takes the frequency phase response coefficients as frequency-domain pre-equalization coefficients.

Preferably, the method further includes dividing the frequency domain into one or more sub-bands, wherein the phase indicator is based on a sub-band, the number of the one or more sub-bands is larger than or equal to 1, the transmitter generates the frequency-domain pre-equalization coefficients on the allocated bandwidth according to a corresponding relationship between the phase indication and the one or more sub-bands.

Preferably, the transmitter obtains quantified phase information of channel impulse response according to the phase indicator, converts the phase information into corresponding frequency phase response coefficients and takes the frequency phase response coefficients as frequency-domain pre-equalization coefficients.

Preferably, the quantified phase information of the channel impulse response is phase information of a highest energy path in a multipath channel, or is phase information of an average of phases of X highest energy paths in a multipath channel, wherein X is larger than 1.

Preferably, the feedback is obtained from phase indication bit field added in uplink scheduling grant or from a dedicated feedback channel.

The present disclosure also provides a signal receiving method based on filter bank, including determining, by a receiver, whether post-equalization is to be performed to demodulated signals based on filter bank according to pre-equalization configuration information; wherein the pre-equalization configuration information indicates whether pre-equalization is enabled or disabled, if the pre-equalization configuration information indicates that the pre-equalization is enabled, performing by the receiver a post-equalization to the demodulated signals based on filter bank according to a composited equivalent channel frequency response of the pre-equalization coefficients and the channel frequency response, if the pre-equalization configuration information indicates that the pre-equalization is disabled, performing by the receiver, amplitude and phase post-equalization to the demodulated signals based on filter bank according to an estimated channel frequency response.

The present disclosure also provides a signal receiving method based on filter bank, including determining, by a receiver, whether post-equalization is to be performed to demodulated signals based on filter bank according to pre-equalization configuration information indicated to a transmitter; wherein the pre-equalization configuration information indicates whether pre-equalization is enabled, if the pre-equalization configuration information indicates that the pre-equalization is enabled, and a pre-equalization manner is performing pre-equalization to both amplitude and phase, the receiver does not performing post-equalization to the demodulated signals based on filter bank, if the pre-equalization configuration information indicates that the pre-equalization is enabled, and a pre-equalization manner is performing pre-equalization to merely phase, performing by the receiver a post-equalization to the demodulated signals based on filter bank according to a composited equivalent channel frequency response of the pre-equalization coefficients and the channel frequency response, if the pre-equalization configuration information indicates that the pre-equalization is disabled, performing by the receiver, amplitude and phase post-equalization to the demodulated signals based on filter bank according to an estimated channel frequency response.

Preferably, the performing of the post-equalization according to the composited equivalent channel frequency response of the pre-equalization coefficients and the channel frequency response includes: the receiver directly estimating the composited equivalent channel frequency response of the pre-equalization coefficients and the channel frequency response through receiving a reference signal which is pre-equalized and used for channel estimation; or the receiver performing a channel estimation to a reference signal which is not pre-equalized and indirectly estimating the composited equivalent channel frequency response of the pre-equalization coefficients and the channel frequency response according to a pre-equalization manner adopted by the transmitter, wherein the equivalent channel frequency response is used for performing post-equalization to the demodulated signals based on filter bank.

Preferably, the pre-equalization manner is pre-defined or an indication of the pre-equalization manner is contained in the pre-equalization configuration information.

The present disclosure also provides a transmitter based on filter bank, including a control signaling processing module, a pre-equalization switch, an information source, a pre-equalization coefficients generating module and a transmission synthesis filter bank, wherein the control signaling processing module is to obtain pre-equalization configuration information, wherein the pre-equalization configuration information indicates whether pre-equalization is enabled, if the pre-equalization configuration information indicates that pre-equalization is enabled, the control signaling processing module controls the pre-equalization switch to connect with the pre-equalization coefficients generating module, such that real number signals generated by the information source are pre-equalized according to the pre-equalization coefficients generated by the pre-equalization coefficients generating module before being modulated by the transmission synthesis filter bank, if the pre-equalization configuration information indicates that the pre-equalization is disabled, the control signaling processing module controls the pre-equalization switch to connect with the transmission synthesis filter bank, such that real number signals generated by the information source are directly modulated by the transmission synthesis filter bank.

Preferably, the pre-equalization configuration information is obtained by the control signaling processing module from scheduling control signaling.

Preferably, the pre-equalization coefficients generating module generates the pre-equalization coefficients according to a pre-equalization manner, wherein the pre-equalization manner is pre-defined or an indication of the pre-equalization manner is contained in the pre-equalization configuration information.

The present disclosure further provides a receiver based on filter bank, including: a receiving analysis filter bank, a post-equalization switch, a post-equalization coefficients generating module, and a real part obtaining module; wherein the post-equalization switch is to determine whether post-equalization is to be performed to demodulated signals of the receiving analysis filter bank according to pre-equalization configuration information indicated to a transmitter, wherein the pre-equalization configuration information indicates whether pre-equalization is enabled, if the pre-equalization configuration information indicates that pre-equalization is enabled, and a pre-equalization manner is to perform pre-equalization to both amplitude and phase, the post-equalization switch connects to the receiving analysis filter bank and the real part obtaining module, if the pre-equalization configuration information indicates that pre-equalization is enabled, and a pre-equalization manner is performing pre-equalization to merely phase, the post-equalization switch transmits the pre-equalization manner to the post-equalization coefficients generating module, and connects to the receiving analysis filter bank and the post-equalization coefficients generating module, such that the post-equalization coefficients generating module generates post-equalization coefficients, and performs amplitude post-equalization to demodulated signals of the receiving analysis filter bank according to a composited equivalent channel frequency response of the pre-equalization coefficients and the channel frequency response before transmitting to the real part obtaining module, if the pre-equalization configuration information indicates that pre-equalization is disabled, the post-equalization switch connects to the receiving analysis filter bank and the post-equalization coefficients generating module, the post-equalization coefficients generating module generates post-equalization coefficients and performs amplitude and phase post-equalization to demodulated signals of the receiving analysis filter bank according to an estimated channel frequency response before transmitting to the real part obtaining module.

Preferably, the pre-equalization manner is pre-defined or an indication of the pre-equalization manner is contained in the pre-equalization configuration information.

The OQAM signal transmission solution with configurable pre-equalization provided by the present disclosure provides flexibility for network scheduling, ensures spectrum efficient as much as possible under heavy network loads through pre-equalization to the transmission signal, and avoids impact of tails under low network loads through changing configuration of subframes so as to ensure quality of service of users as much as possible.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. The present invention is described in further detail hereinafter with reference to accompanying drawings and embodiments to make the objective, technical solution and merits therein clearer.

Filter bank modulation scheme FBMC can achieve waveform with proper time/frequency localization by adopting well-designed prototype filter function, e.g., based on prototype filter functions such as Isotropic Orthogonal Transform Algorithm (IOTA), or Extended Gaussian Function, or European PHYDYAS. FBMC performs pulse shaping to signals of each subcarrier utilizing filters with better time/frequency localization, such that:

1) FBMC is able to restrain ISI brought out by multipath without the need of CP, which brings higher spectrum efficiency and energy efficiency compared to OFDM, and has a better receiving robustness under larger time error at the same time, therefore a non-rigid synchronized transmission is allowed;

2) Benefit from better frequency localization, FBMC is able to transmit signals within extremely narrow frequency resources and remain lower out-of-band leakage. Such that, Inter-Carrier Interferences (ICI) brought out by Doppler or phase noise can be restrained better.

Therefore, FBMC has great potential in scenarios such as cognitive radio, sporadic access and asynchronous transmission.

Figure 1:
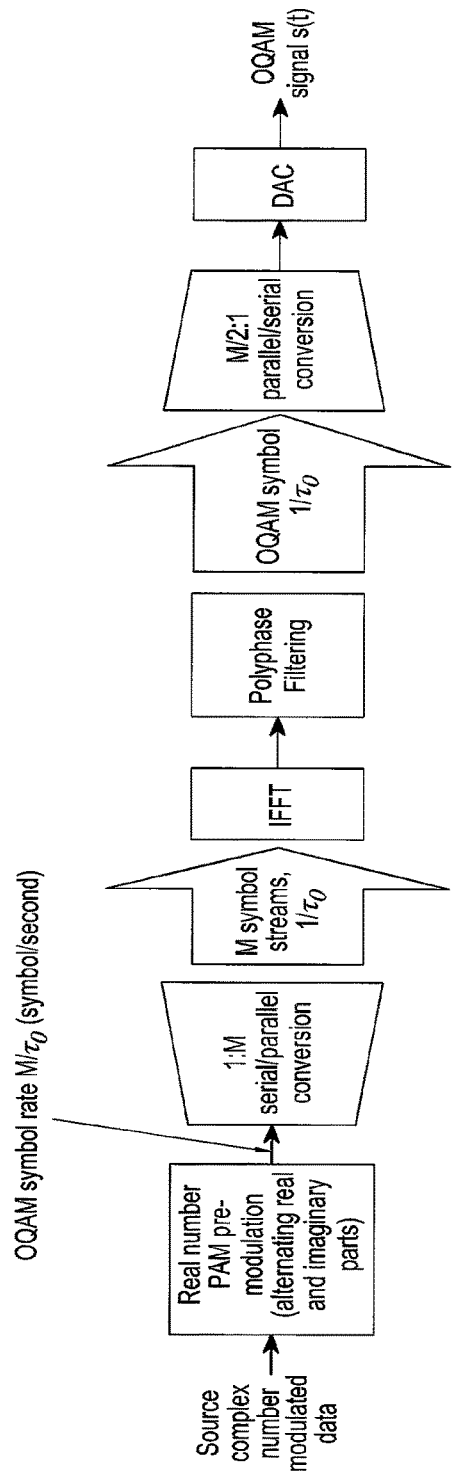
FIG. 1 is a schematic diagram illustrating generation of FBMC/OQAM signal according to an embodiment of the present disclosure.

In order to maximize the spectrum efficiency of FBMC, Offset Quadrature Amplitude Modulation (OQAM) technique has been proposed, which is referred to as FBMC/OQAM or OFDM/OQAM, hereinafter shortened as OQAM. With OQAM, QAM modulated signals are divided into real part and imaginary part, which are transmitted on subcarriers in a staggered manner. At a receiving end, if there is no impact of the channel, the transmitted signals can be reconstructed by alternatively retrieving real part and imaginary part of the signals on each subcarrier. FIG. 1 is a schematic diagram illustrating generation of a FBMC/OQAM signal. Functions of various modules can be easily understood based on a following OQAM signal formula. Baseband equivalent form of continuous-time multi-carrier FBMC/OQAM signal can be expressed by a following formula (1):

$$s(t) = \sum_{n \in Z} \sum_{m=0}^{M-1} a_{m,n} \underbrace{j^{m+n} e^{j2\pi m v_0 t} g(t-n\tau_0)}_{g_{m,n}(t)} \quad (1)$$

wherein $(\bullet)_{m,n}$ denotes frequency-time point; $a_{m,n}$ denotes real-valued modulation signal transmitted on the mth subcarrier of the nth symbol with a symbol duration of, i.e., a Pulse Amplitude Modulation (PAM) symbol, taking from the real part or the imaginary part of a complex Quadrature Amplitude Modulation (QAM) symbol with a symbol period of, e.g., $$a_{m,n} = \begin{cases} \Re\{c_{m,\tilde{n}}\}, & n \text{ is an even number} \\ \Im\{c_{m,\tilde{n}}\}, & n \text{ is an odd number} \end{cases}$$

wherein $\Re\{\bullet\}$ and $\Im\{\bullet\}$ respectively denote functions of obtaining the real part and the obtaining the imaginary part; j is an imaginary symbol, $j^{m+n}$ denotes alternation of a real number and an imaginary number; M is an even number and denotes the number of subcarriers; Z denotes a set of transmitted symbols; $v_0$ denotes interval of subcarriers; $\tau_0$ denotes symbol period of the OQAM, $\tau_0=\tau/2=1/(2v_0)$; g denotes a prototype filter function, the time-domain impulse response length is generally K times of $\tau$, which leads to partial overlap of time-domain waveforms of adjacent (2K−1) symbols. Therefore, K is also referred to as an overlapping factor of the filter; $g_{m,n}(t)$ denotes a synthesis filter function used for modulate $a_{m,n}$.

It can be seen that the symbol rate of OQAM is two times of the conventional OFDM symbol rate, and no cyclic prefix is added. Since OQAM is modulated by real number, the information amount of each OQAM symbol is half of the conventional OFDM.

The orthogonality of the OQAM in real field is realized through designing a prototype filter function to make an inner product of the synthesis filter function in the transmission phase and the analysis filter function during the receiving phase meets or approximately meets a formula (2), i.e., the prototype filter needs to meet:

$$\Re\{\underbrace{\langle g_{m,n} | g_{m',n'} \rangle}_{\langle g \rangle_{m,n}^{m',n'}}\} = \Re\left(\int g_{m,n}(t) \cdot g_{m',n'}^*(t) dt\right) = \delta_{m,m'} \delta_{n,n'} \quad (2)$$

wherein * denotes complex conjugation, denotes an operation of obtaining the real part, $\langle \bullet | \bullet \rangle$ denotes an operation of obtaining an inner product, if m=m', n=n', then, $\delta_{m,m'}=1$, $\delta_{n,n'}=1$ otherwise the values of them are 0. In other words, if m≠m' or n≠n', the inner product is a pure imaginary. For simplicity, the inner product is expressed by $\langle g \rangle_{m,n}^{m',n'}$. Obviously, interferences caused by signals of different subcarriers and different symbols are pure imaginary interferences. Thus, when the FBMC/OQAM modulated signal s(t) is transmitted via a distortion-free channel, perfect reconstruction (PR) of the originally transmitted real number signal $a_{m,n}$ can be realized through a simple operation to the received signal using a receiving analysis filter (AF) $g_{m,n}^*(t)$ matching the transmitting synthesis filter (SF) $g_{m,n}(t)$ according to the formula (3), wherein $\eta_0$ denotes noises.

Subsequently, a complex QAM signal $c_{m,\tilde{n}}$ can be synthesized, so as to demodulate the original data.

$$\hat{a}_{m,n} = \Re\{y_{m,n}\} = \Re\{\langle (s(t)+n(t))|g_{m,n}\rangle\} = a_{m,n}+\eta_0, m=0,\ldots M-1, n \in Z \quad (3)$$

But a practical channel is not distortion free. It is well-known that the channel usually has a frequency-selective fading due to multipath and/or time-selective fading due to Doppler effects. The channel impulse response is simplified as $h(t)=\|h\|\vec{h}$, wherein $\|h\|$ (norm) denotes amplitude variation, $\vec{h}$ denotes phase variation. Suppose that channel condition does not change during unit symbol period and unit subcarrier bandwidth, $H_{m,n}$ is used to denote the frequency response of the channel h(t) on the m-th subcarrier of the nth symbol. Thus, the received signal can be denoted by:

$$r(t) = \sum_{n \in Z} \sum_{m=0}^{M-1} H_{m,n} a_{m,n} g_{m,n}(t) + n(t) \quad (4)$$

It is out of question that the complex channel will damage the orthogonality of the OQAM in the real field. The demodulation of $a_{m0,n0}$ is taken as an example, as shown in formula (5). $a_{m0,n0}$ cannot be retrieved by directly obtaining the real part of $y_{m0,n0}$. Additional operations must be performed to eliminate or reduce to the largest extent the damage of $H_{m,n}$ to the orthogonality in the real field.

$$y_{m0,n0} = \langle r(t) | g_{m0,n0} \rangle = H_{m0,n0} a_{m0,n0} + \underbrace{\sum_{\substack{n \\ (m,n) \neq (m0,n0)}} \sum_{m=0}^{M-1} H_{m,n} a_{m,n} \langle g \rangle_{m,n}^{m0,n0}}_{I_{m0,n0}} + \eta_0 \quad (5)$$

The above $I_{m0,n0}$ is relevant to the design of the localization property of the prototype filter, therefore is also referred to as intrinsic interference. Due to the TFL characteristic of the prototype filter g, in inherent interference items on (m0, n0), merely impacts of limited neighboring symbols m, n)≠(m0, n0) cannot be ignored, but not all symbols. In other words, the pure imaginary $\langle g \rangle_{m,n}^{m0,n0}$ has relatively large absolute values on merely limited (m, n)≠(m0, n0) symbols and cannot be ignored, others are very small, approach to 0 or are 0. Thus, compared to the noises, the latter part can be completely omitted and merely those limited neighboring symbols need to be considered. The values of the limited neighboring (m, n)≠(m0, n0) symbols which cannot be ignored are denoted by a set $\Omega_{\Delta m, \Delta n}=\{(p,q), |p-m0| \leq \Delta m, |q-n0| \leq \Delta m\}$ (this set is corresponding to the time-frequency localization of the prototype filter function). Thus, $I_{m0,n0}$ can be further expressed by:

$$I_{m0,n0} = \underbrace{\sum_{(p,q) \in \Omega_{\Delta m, \Delta n}} H_{p,q} a_{p,q} \langle g \rangle_{p,q}^{m0,n0}}_{\xi_{m0,n0}, \text{ main ICI and ISI}} + \underbrace{\sum_{(p',q') \notin \Omega_{\Delta m, \Delta n}} H_{p',q'} a_{p',q'} \langle g \rangle_{p',q'}^{m0,n0}}_{J_{m0,n0}, \text{ can be omitted}} + \eta_0 \quad (6)$$

It is apparent according to the formulas (5) and (6) that, in order to eliminate $\xi_{m0,n0}$ and retrieve $a_{m0,n0}$ through simple frequency-domain channel equalization, condition of the following formula (7) should be met. That is to say, although a time variant multipath channel is passed, the channel is required to be correlated within a local scope denoted by $\Omega_{\Delta m, \Delta n}$. Thus, the design of the prototype filter needs to match the channel characteristic. The better the time-frequency localization, the smaller that the scope of the corresponding $\Omega_{\Delta m, \Delta n}$ and the easier that the condition (7) can be met.

$$H_{m0,n0} \approx H_{p,q}, (p,q) \in \Omega_{\Delta m, \Delta n} \qquad (7)$$

Therefore, the signals after the receiving filter as shown in formula (5) can be approximately expressed by formula (8):

$$y_{m0,n0} \approx H_{m0,n0} a_{m0,n0} + \xi_{m0,n0} \approx \qquad (8)$$

$$H_{mo,no}\left(a_{mo,no} + \underbrace{\sum_{(p,q) \in \Omega_{\Delta m, \Delta n}} a_{p,q} \langle g \rangle_{p,q}^{m0,n0}}_{\zeta, \text{ pure imaginary}}\right) + \eta_0$$

As long as the channel frequency response at the (m0, n0) is equalized, the transmitted $a_{m0,n0}$ can be retrieved through a real part obtaining operation.

In view of the above, although FBMC/OQAM symbols are partially overlapped in the time-domain and the frequency-domain subcarriers are not orthogonal in the complex field as OFDM symbols, if the alternation of the real part and imaginary part of the OQAM and the localization design of the prototype filter make the demodulated signal output meets the condition of formula (7), impact of the channel can be eliminated by simple frequency-domain equalization, thereby reconstructing the complex real field orthogonality. Then the transmitted signals can be reconstructed through demodulation by a real part obtaining operation. A typical OQAM signal equalization detection can be expressed by formula (9), wherein SINR denotes an information-to-noise ratio when there are multi-user interferences.

$$\Re\left\{\frac{r(t) \cdot H_{m,n}^*}{\|H_{m,n}\|^2 + SINR} \middle| g_{m,n}(t)\right\} \propto \hat{a}_{m,n}, \qquad (9)$$

$\|\cdot\|$ denotes a modulo operation.

For downlink or uplink single user transmission, as long as the design of the prototype filter matches the delay spread and/or Doppler frequency spread of the channel, the condition in formula (7) can be met through configuring a reasonable subcarrier interval and data transmission duration. As such, the ICI and ISI can be omitted. However, the inventor of the present application regards that for the uplink multi-user data block transmission of FBMC/OQAM, the condition of formula (7) is hard to be met. The reason is signals of different uplink users are usually transmitted to the base station via non-correlated channels. Therefore, time-domain neighboring sets $\Omega_{\Delta n} = \{|q - n0| \le \Delta n\}$ of different users overlapping in the frequency-domain are hard to be regarded as correlated, which is the reason that the tail of the FBMC/OQAM requires special processing during uplink multi-user data block transmission.

Figure 2A:
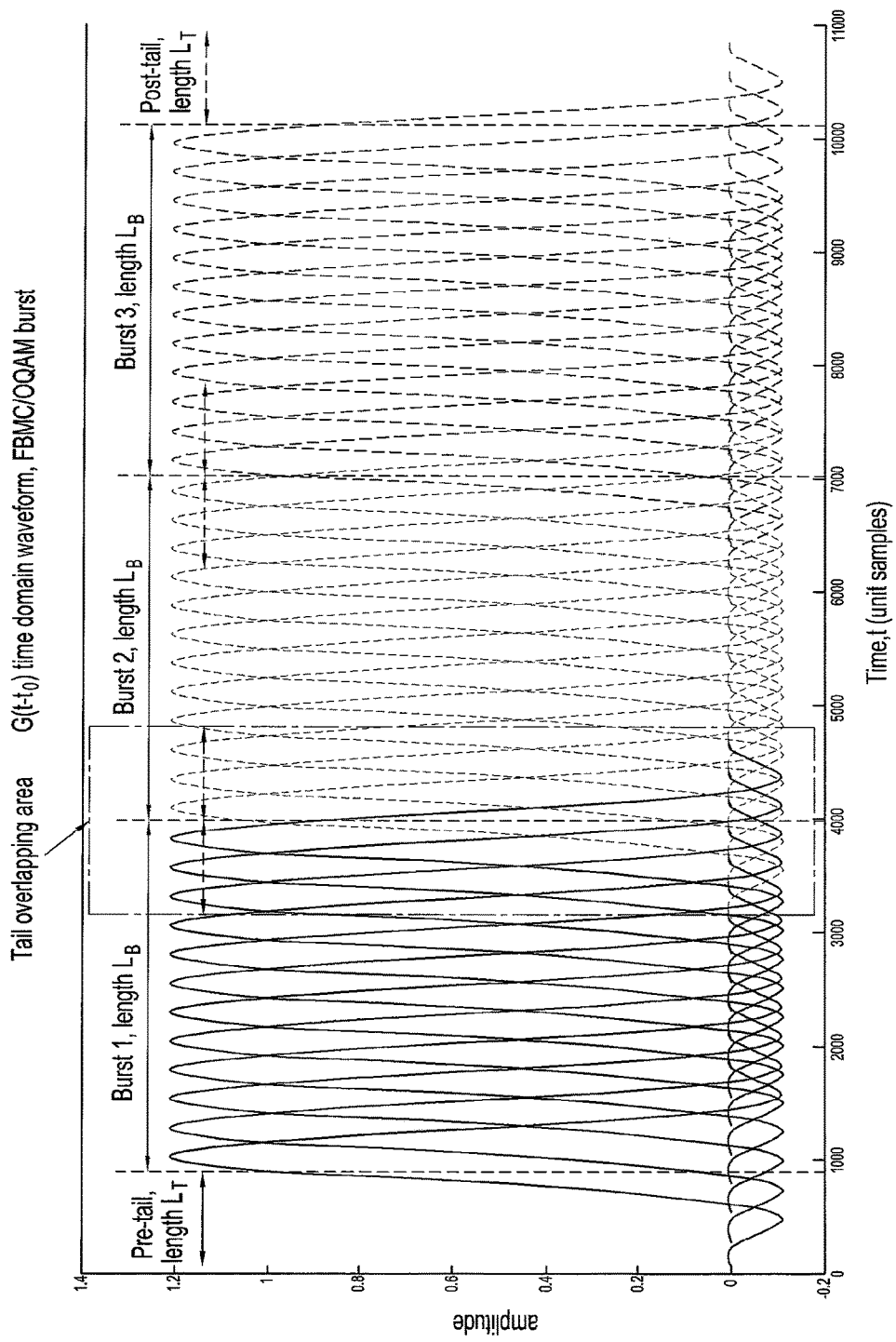
FIG. 2A is a schematic diagram illustrating a tail effect during burst transmission of FBMC/OQAM signals according to an embodiment of the present disclosure.
Figure 2B:
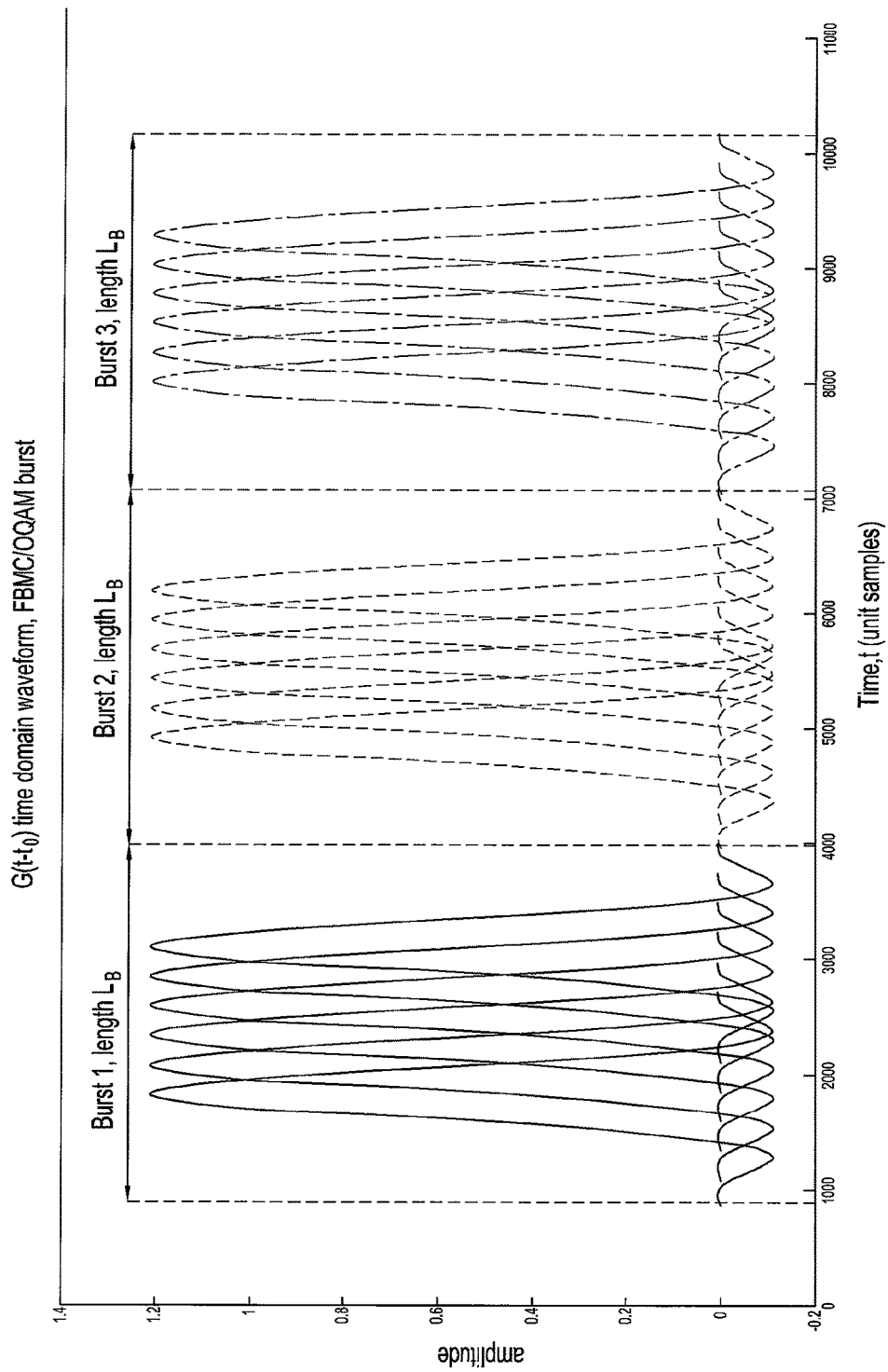
FIG. 2B is a schematic diagram illustrating a scenario that wave forms of data blocks are not overlapped.
Figure 2C:
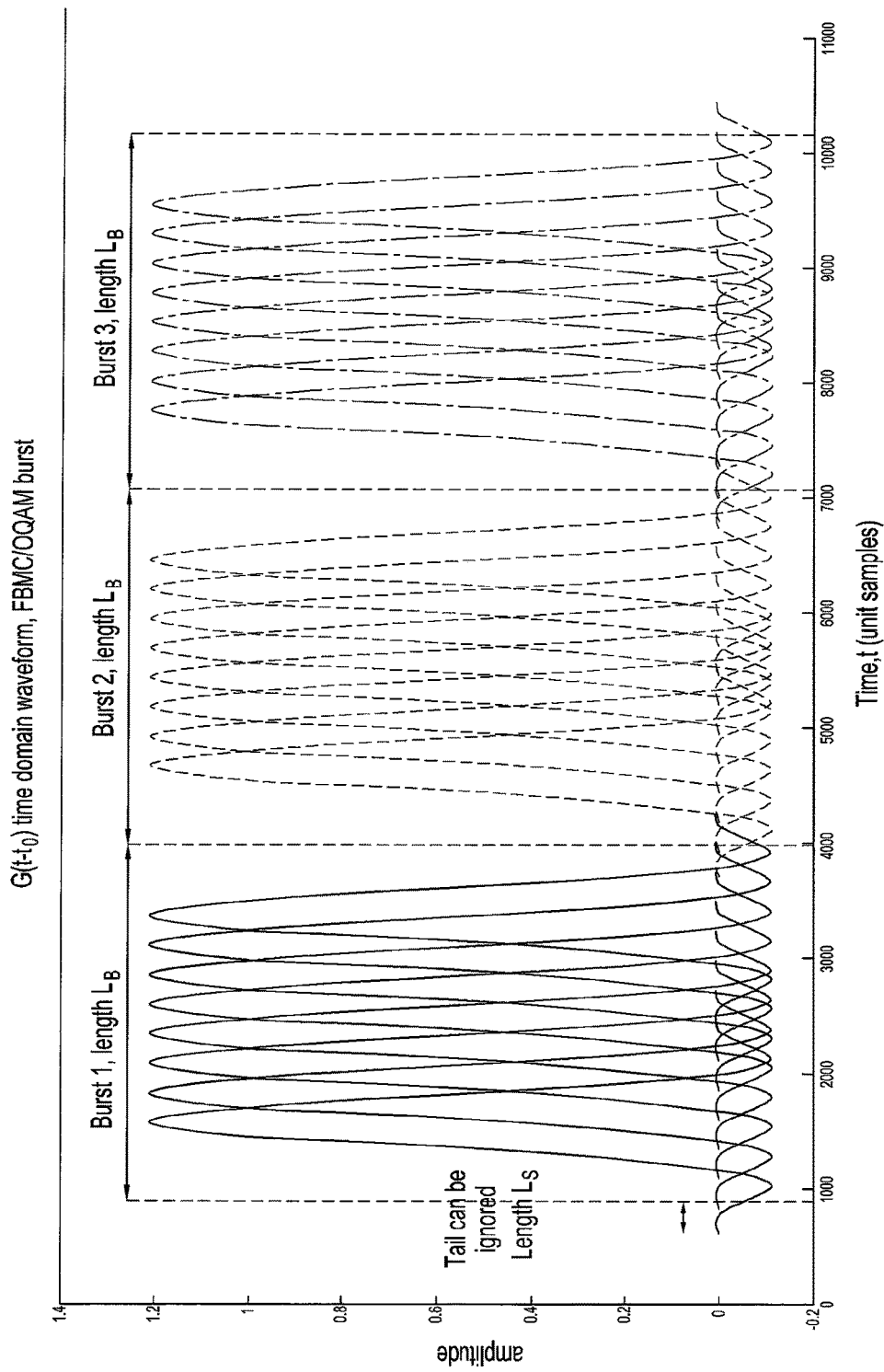
FIG. 2C is a schematic diagram illustrating a scenario that wave forms of data blocks are partially overlapped.

Hereinafter the tail problem is described. Communication system resources are generally divided into time-frequency resource grids according to time and frequency. Then the minimum time-frequency resource grids are grouped into basic resource blocks to facilitate scheduling. For example, Transmission Time Interval (TTI) or subframe (also referred to as burst) defined in communication standards refer to a concept of transmission via basic resource blocks in time; in the frequency-domain, the concept of the basic resource block is defined by size of bandwidth, e.g., several subcarriers. Finally, the data blocks of the user are mapped to the resource blocks for transmission. OFDM adopts rectangle waveform and therefore the symbols of one resource block are closely adjacent to each other and there is no overlap. However, FBMC/OQAM adopts a prototype filter with a relatively long length, although a symbol is transmitted during each $\tau_0$, different from OFDM, the length of each symbol is not consistent with the symbol period but exceeds a lot. Thus, a data block consists of multiple symbols has a pre-tail and a post-tail. Referring to the waveform of the prototype filter on the subcarrier 0 shown in FIG. 2A, burst 1 denotes the data block transmitted by a first user, burst 2 denotes the data block transmitted by a second user, burst 3 denotes the data block transmitted by the third user, the length of each of them is $L_B$, containing several OQAM symbols, the tail of each burst contains a pre-tail and a post-tail, each has a length of $L_T$. The length of the tail is subject to the length of the prototype filter. It can be seen that the tail leads to overlapping between waveforms of data blocks. Thus, the interferences need to be solved. FIG. 2B shows a situation that there is no overlapping between the waveforms of the data blocks of the uses. At this time, OQAM symbols transmitted in each data block are reduced, which leads to waste of resources. FIG. 2C shows a situation that the waveforms of the data blocks of the users are partially overlapping. In a practical design, it can be used as a compromised option. In addition, if it is desired to avoid waste through cutting off the tails, the cut-off can lead to waveform distortion and therefore bring additional ICI. This manner should be adopted cautiously after estimating the spectrum efficiency could be reached.

Figure 3:
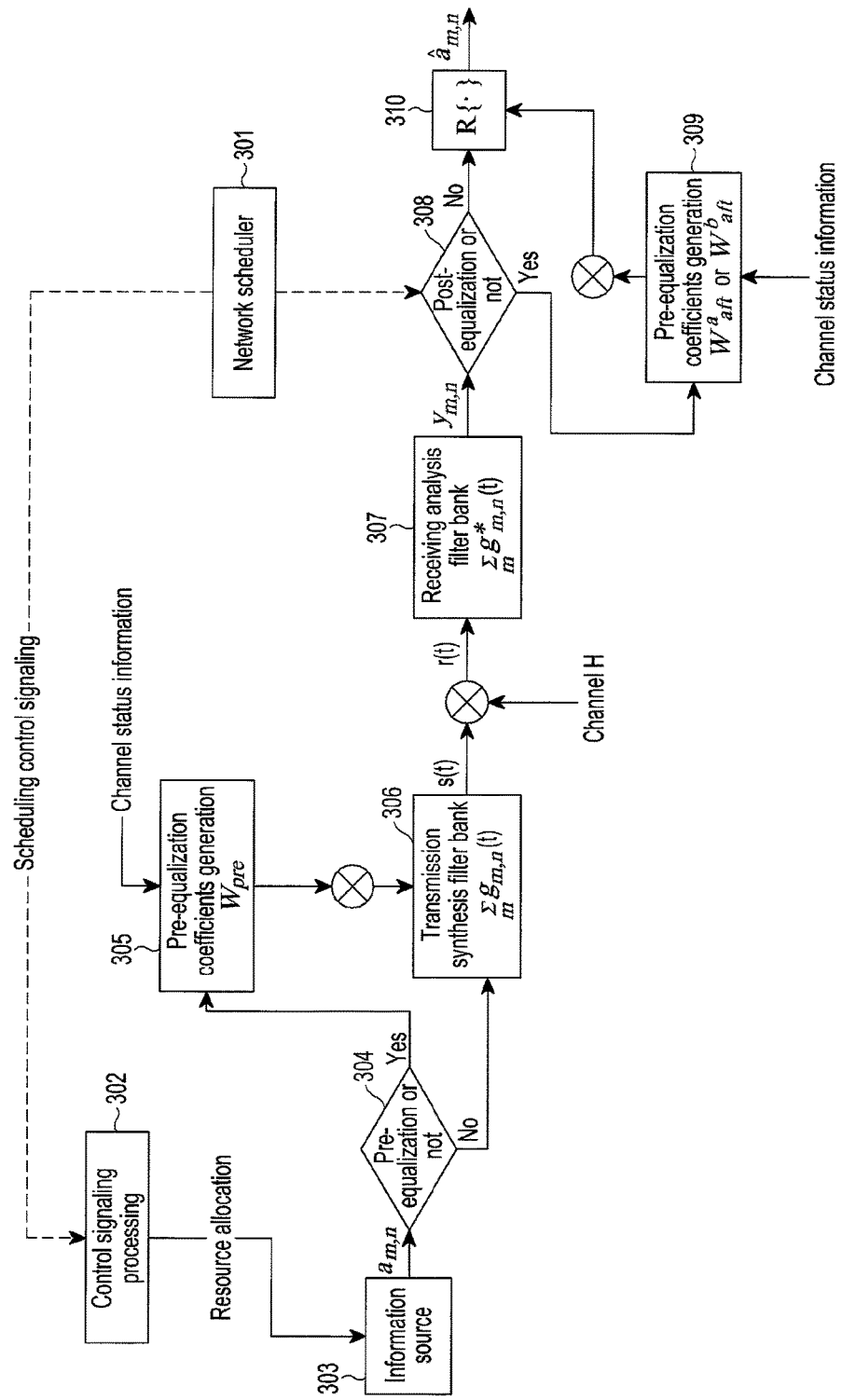
FIG. 3 is a schematic diagram illustrating a FBMC/OQAM system according to an embodiment of the present disclosure.

With respect to the above, the present disclosure provides an FBMC/OQAM system with configurable pre-equalization and a signal transmission and receiving method of the system. FIG. 3 shows a schematic diagram of the present disclosure. Hereinafter, the principle of the FBMC/OQAM system of the present disclosure is described with reference to FIG. 3.

a) a control signaling processing unit (302) obtains from a network scheduler (301), scheduling control signaling, also referred to as scheduling grant. The scheduling grant includes at least resource allocation and mapping information and pre-equalization configuration information. Preferably, the resource allocation and mapping information is used to indicate time-frequency positions of the resource blocks for transmitting data, number of OQAM symbols on basic resource block or burst, and the mapping from the data to the resource blocks. The pre-equalization configuration information is used to indicate whether pre-equalization is enabled when data is transmitted on corresponding resources. Furthermore, if the pre-equalization is enabled, a pre-equalization manner can be configured, or the pre-equalization manner can be configured in advance. The pre-equalization manner can include: performing pre-equalization to both the amplitude and the phase based on channel reciprocity, or, performing pre-equalization to merely the phase based on channel reciprocity, or performing pre-equalization to merely the phase according to limited feedback. The pre-equalization manner determines pre-equalization coefficients $W_{pre}$. In addition, numbers of OQAM symbols on basic resource block or burst are configured to be different when the pre-equalization is enabled and disabled, i.e., subframe type information adopted when the pre-equalization is enable and disabled can be configured, the subframe type information indicates the number of symbols transmitted in the subframe and the transmission timing of the first symbol. That is, different subframe types can be configured. Different subframe types have different tail lengths extending beyond the subframe. It can be realized through configuring the number of OQAM symbols transmitted in a subframe. Different subframe types are utilized when the pre-equalization is enabled and disabled.

b) A signal source (303) prepares the data to be transmitted according to the allocated resources, wherein the data is real number signal, denoted by $a_{m,n}$.

c) A pre-equalization switch (304) determines according to the pre-equalization configuration information obtained from 302 whether pre-equalization is to be performed to the real number signal $a_{m,n}$ outputted by 303 before OQAM modulation. If the pre-equalization is not enabled, the real number signal is directly transmitted to a synthesis filter bank (306) for OQAM modulation after serial/parallel conversion. At this time, the output s(t) can be expressed by formula (1). If the pre-equalization is enabled, pre-equalization coefficients generating unit (305) generates pre-equalization coefficients $W_{pre}$ according to obtained channel status information and the configured pre-equalization manner. The $a_{m,n}$ is pre-processed by the pre-equalization coefficients before the OQAM modulation at 306, then OQAM signal s(t) is generated. The purpose is to keep the signal tend to meet the real field orthogonality of the OQAM after passing through the channel, i.e., the pre-equalization is performed with respect to the channel, thus the composited equivalent channel frequency response H́ is a real number or the imaginary part is small and can be ignored, i.e., H́=$W_{pre}$H≅$\Re$, wherein $\Re$ denotes a real number, ≅ denotes equal to or close to, H denotes channel frequency response; or let phases of equivalent channel frequency responses H̃ of different users on adjacent bursts close as much as possible, so as to reduce interferences brought out by tail overlapping. Herein:

If the pre-equalization manner is to perform pre-equalization to both the amplitude and the phase, complete channel status information is generally required to be obtained based on channel reciprocity to generate the pre-equalization coefficients $W_{pre}$, such that the composited equivalent channel frequency response of the pre-equalization coefficients and the channel frequency response is a real number or its imaginary part approaches to 0, and the modulo of the equivalent channel frequency response is close to 1, i.e., $\Re$=1.

If the pre-equalization manner is performing pre-equalization to merely the phase, in a practical system, complete channel status information can be obtained based on channel reciprocity to generate the pre-equalization coefficients $W_{pre}$ or phase adjustment information can be obtained based on limited feedback to generate the pre-equalization coefficients $W_{pre}$, according to the former, the composited equivalent channel frequency response of the pre-equalization coefficients and the channel frequency response is a real number or its imaginary part approaches to 0, and the modulo of the equivalent channel frequency response is approximate to the modulo of the channel frequency response, i.e., $\Re$=||H||. Therefore, damage of the channel to the real field orthogonality of OQAM is eliminated greatly and a better performance is obtained. For the latter, since the practical system allows limited feedback overhead, it is only possible to let phases of composited equivalent channels of different users tend to be the same as much as possible through quantified phase adjustment, so as to reduce damage of the channel to the real field orthogonality of the OQAM as much as possible via post-equalization, which merely has suboptimal performance.

The s(t) after the pre-equalization can be expressed by formula (10), wherein the channel status information used in the pre-equalization can be obtained through feedback or channel reciprocity.

$$s(t) = \sum_{n \in Z} \sum_{m=0}^{M-1} W_{pre,(m,n)} a_{m,n} \underbrace{j^{m+n} e^{j2\pi m v_0 t} g(t - n\tau_0)}_{g_{m,n}(t)} \quad (10)$$

d) A receiving analysis filter bank (307) performs an OQAM demodulation to the OQAM signals r(t) transmitted through the channel, the output is denoted by $y_{m,n}$.

e) According to the pre-equalization configuration information indicated to the transmitter by the network scheduler, a determining module 308 determines whether to perform a post-equalization to the signals outputted by 307. In the case that pre-equalization during data transmission is configured and the pre-equalization manner is performing pre-equalization to both the amplitude and the phase, no post-equalization is performed to the output $y_{m,n}$ of 307. Instead, a real-part obtaining operation is directed performed at 310, so as to obtain the estimated transmission signal $\hat{a}_{m,n}$. If the pre-equalization during data transmission is configured and the pre-equalization manner is performing pre-equalization to merely the phase, a post-equalization is performed to the output $y_{m,n}$ of 307. At this time, the post-equalization is to equalize according to the post-coefficients generated according to the estimated composited equivalent channel frequency response H of the pre-equalization coefficients and the channel frequency response. The utilized post-equalization coefficients are denoted by $W^a_{aft}$. The estimation of the equivalent channel frequency response can be obtained by the receiver via direct estimation through receiving a reference signal which is pre-equalized by the pre-equalization coefficients consistent with the data and used for channel estimation, or obtained by the receiver through performing channel estimation to the reference signal which is not pre-equalized and then indirectly estimating according to the pre-equalization manner of the transmitter. The equalized signals are transmitted to 310 to obtain the real part, so as to obtain the estimated transmission signal $\hat{a}_{m,n}$. If pre-equalization during data transmission is not configured, channel equalization is performed to the amplitude and phase of the output $y_{m,n}$ of 307. The utilized equalization coefficients are denoted by $W^b_{aft}$. The equalized signals are transmitted to 310 to obtain the real part, so as to obtain the estimated transmission signal $\hat{a}_{m,n}$. The channel status information used in the post-equalization can be obtained via pilot signal used for channel estimation.

Hereinafter several preferred embodiments are provided to describe the technical solution of the present disclosure.

Embodiment 1

In practical implementation, baseband signal is directly generated in discrete-time form, which is a sampling sequence on rigid sampling points of a continuous signal, i.e., the sampling frequency meets the sample principle. The discrete baseband signal of the FBMC/OQAM system can be described by formula (11), in which the variable t in formula (1) is replaced by sampling time l:

$$s(1) = \sum_{n \in Z} \sum_{m=0}^{M-1} \underbrace{a_{m,n} j^{m+n} g\left[1 - n\frac{M}{2}\right] e^{j\frac{2\pi m}{M}\left(1 - \frac{L_g-1}{2}\right)}}_{g_{m,n}[1]} \quad (11)$$

Wherein $L_g$ denotes the length of the prototype filter, generally $L_g=KM$, or $KM-1$ or $KM+1$. K denotes an overlapping factor, $$-\frac{L_g - 1}{2}$$

is to make ensure that it is a causal system. It should be noted that, the present disclosure does not related to detailed design of the prototype filter. The waveform of the prototype filter shown in FIG. 2A is merely an example, which is a prototype filter function approximately meet the formula (2), its time-domain tap coefficients are $$\begin{cases} g(0) = 0, \\ g(l) = 1 - 1.94392\cos\left(\frac{2\pi l}{L_g}\right) + 1.414\cos\left(\frac{4\pi l}{L_g}\right) - 0.47029\cos\left(\frac{6\pi l}{L_g}\right), \\ 1 \leq l \leq L_g - 1 \end{cases}.$$

In this embodiment, we suppose that the FBMC/OQAM system is a Time Division Duplex (TDD) system, its parameters are as follows: the number of subcarriers is $M=5^{12}$, the subcarrier interval is $v_0=15$ khz, the sampling frequency is 7.68 Mhz, repeat factor is K=4, the length of the prototype filter is $L_g=2048$ samples. As to the types of the bursts, we assume there are two different types: respectively referred to as Extended Burst (EB) and Non-Extended Burst (NEB). The length of both the EB burst and the NEB burst is 0.4 ms, i.e., 3072 samples. In addition, the lengths of the EB burst and the NEB burst can also be configured differently, i.e., the system can support different kinds of subframe lengths. In this embodiment, the lengths are configured the same for simplicity. As shown in FIG. 2A, the length of the EB is $L_B=0.4$ ms=3072 samples, each burst has a pre-tail and a post-tail, each has a length of $$L_T = (K-1)\frac{M}{2} + \frac{M}{4} = 896$$

samples. Each EB includes 12 symbols. The tails on the two sides extend beyond the burst. The burst as shown in FIG. 2(b) is NEB, the length of the burst is also $L_B=0.4$ ms=3072 samples. But each burst includes 6 symbols as shown in FIG. 2(b). Since 6 symbols are reduced, the tails are within the burst and are not extended beyond the burst. It should be noted that the burst type can also be configured following FIG. 2(c), i.e., each burst includes 8 symbols. A part of the tails is allowed to extend beyond the burst. Since the interference of the tails is relatively small, the determination of the length of the burst and the number of symbols are subject to overall consideration of the system design.

In this embodiment, scheduling options for the multi-user scheduler includes the two options shown in Table 1.

TABLE 1

| Scheduling options | Transmitter | Receiver |
|---|---|---|
| Option A: the frequency bands of the scheduled multiple users are overlapping, bursts of the multiple users are time-division multiplexed (TDM) in consecutive manner. This option is applicable for situations with heavy access network load and limited resources. | The pre-equalization is enabled. Both the channel amplitude and the phase are equalized; EB is adopted to transmit data; and pre-equalization is performed according to the channel reciprocity of the TDD system. | The post-equalization is disabled. |
| Option B: the frequency bands of the scheduled multiple users are overlapping, but the bursts of the users are time-division multiplexed in non-consecutive manner. NEB is adopted. This option is applicable for situations with low access network load and enough resources. | The pre-equalization is disabled; data is transmitted via EB manner. | The post-equalization is enabled. Conventional equalization manner is adopted. Both the amplitude and the phase need to be equalized. |

For facilitating the description, it is assumed that the M subcarriers are all used for user data transmission and the resource allocation and mapping procedure is omitted.

Figure 4:
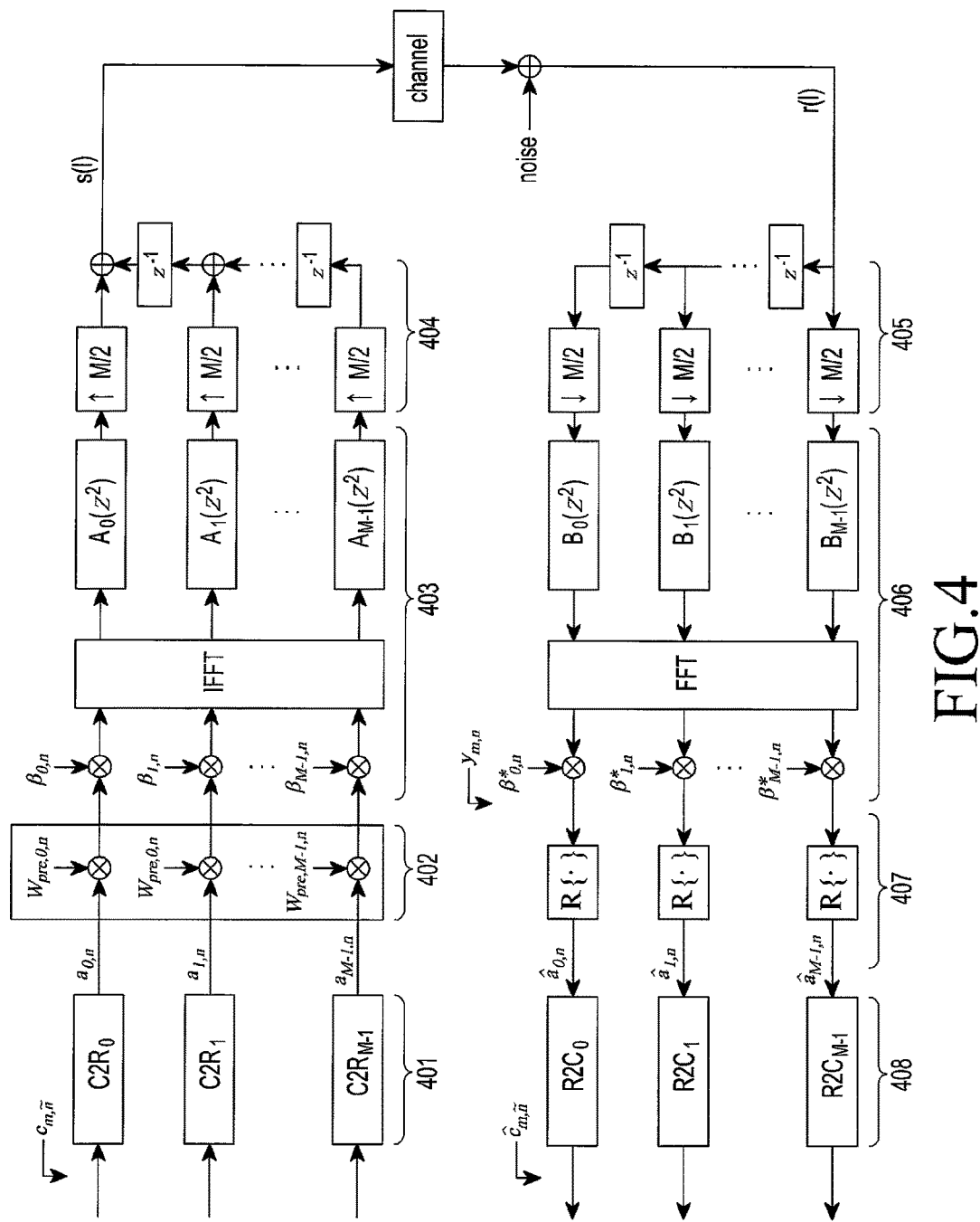
FIG. 4 is a schematic diagram illustrating transmission and receiving of pre-equalized OQAM signals according to a first embodiment of the present disclosure.

If the pre-equalization of above FBMC/OQAM system with configurable pre-equalization is configured as enabled (scheduling option A), the transmission and the receiving of the baseband signal are respectively as follows:

The transmitter knows from the scheduling control signaling transmitted by the network scheduler that pre-equalization needs to be performed to signals to be transmitted by the transmitter and the signals are to be transmitted using the EB structure, and the transmitter generates the frequency-domain pre-equalization coefficients according to the channel reciprocity of the TDD to perform the pre-equalization to the transmission signals before OQAM modulation. FIG. 4 shows a schematic diagram of an implementation of OQAM signal transmission and receiving with pre-equalization.

As shown in FIG. 4, At the transmitting end, 401 is a converting module for converting complex QAM modulated symbol of OQAM to real number PAM signal. 402 is a pre-equalization module. 403 is a synthesis filter bank implementation module adopting Inverse Fast Fourier Transform (IFFT) and polyphase filtering. 404 is a serial/parallel conversion module. OQAM signals with pre-equalization can be expressed by formula (12). As shown in FIG. 4, before IFFT, signals to be transmitted on each subcarrier is multiplied with coefficients $W_{pre}$, the pre-equalization coefficients are used to avoid impact of time-variant multipath channel on the real field orthogonality of the OQAM. Thus, the transmitter estimates according to the channel reciprocity to obtain the frequency response $\hat{H}_{m,n}$ on the m-th subcarrier of the nth symbol, and generates the coefficients according to formula (13). The formula (13) can also be referred to as a matching pre-equalization algorithm, i.e., obtaining a conjugate of the estimated channel and dividing the conjugate by the square of the modulus of the estimated channel.

$$s(l) = \sum_{n \in Z} \sum_{m=0}^{M-1} W_{pre,(m,n)} a_{m,n} \underbrace{j^{m+n} g\left[l - n\frac{M}{2}\right] e^{j\frac{2\pi m}{M}\left(l - \frac{L_g-1}{2}\right)}}_{g_{m,n}[l]} \quad (12)$$

$$= \sum_{n \in Z} \sum_{m=0}^{M-1} W_{pre,(m,n)} a_{m,n} \underbrace{j^{m+n} e^{-j\frac{2\pi m}{M}\left(\frac{L_g-1}{2}\right)}}_{\beta_{m,n}} \underbrace{e^{j\frac{2\pi m}{M} l}}_{IFFT} \underbrace{g\left[l - n\frac{M}{2}\right]}_{polyphase\ filtering}$$

$$W_{pre} = \frac{\hat{H}_{m,n}^*}{\|\hat{H}_{m,n}\|^2}, \quad (13)$$

$\|\cdot\|$ denotes modulo operation

At the receiving end, 405 is a serial/parallel conversion module, 406 is a receiving synthesis filter bank implementation module which matches 403, 407 is a real part obtaining module, 408 is a real number to complex number conversion module which operates inversely with respect to module 401. The OQAM signals r(l) transmitted through the channel received by the receiver can be expressed by formula (14):

$$r(l) = \sum_{n \in Z} \sum_{m=0}^{M-1} H_{m,n} W_{pre,(m,n)} a_{m,n} g_{m,n}[l] + n(l) \quad (14)$$

$$= \sum_{n \in Z} \sum_{m=0}^{M-1} \underbrace{H_{m,n} \frac{\hat{H}_{m,n}^*}{\|\hat{H}_{m,n}\|^2}}_{\tilde{H}} a_{m,n} g_{m,n}[l] + n(l)$$

It is known from formula (14) that, in the case that the channel estimation error is within a certain range, $\hat{H}_{m,n}$ can be regarded as equal to the real channel $H_{m,n}$. Then, the composited equivalent channel frequency response $\tilde{H}=W_{pre}H\approx 1$. Therefore module 406 of the receiver demodulates the received r(l) is as shown in formula (15), wherein the output (m0, n0) on (m0, n0) is taken as an example. According to design of the prototype filter, the latter item can be regarded as an imaginary. Therefore, according to the pre-equalization information configured by the network scheduler to the transmitter, the receiver directly inputs the output $y_{m,n}$ of the module 406 to the module 407 to perform a real part obtaining operation, so as to obtain the transmitted signals $\hat{a}_{m,n}=\Re\{y_{m,n}\}=a_{m,n}+\eta_0, m=0,\ldots M-1, n\in Z$.

$$y_{m0,n0} = \langle r(l) | g_{m,n} \rangle = \tilde{H} a_{m_0,n_0} + \underbrace{\sum_{n} \sum_{m=0}^{M-1} \tilde{H} a_{m,n} \langle g \rangle_{m,n}^{m0,n0}}_{(m,n) \neq (m0,n0)} + \eta_0 \quad (15)$$

Apparently, through the description of the above pre-equalization solution, even if the EB-based multi-user time division multiplex shown in FIG. 2A is adopted for different users, the tail will not lead to serious interferences due to not meeting the condition of formula (7), i.e., if only pre-equalization is properly performed to the transmission signals of each user, the tails are allowed to extend beyond the bursts. The spectrum efficiency can be maximized adopting the EB transmission manner.

Figure 5:
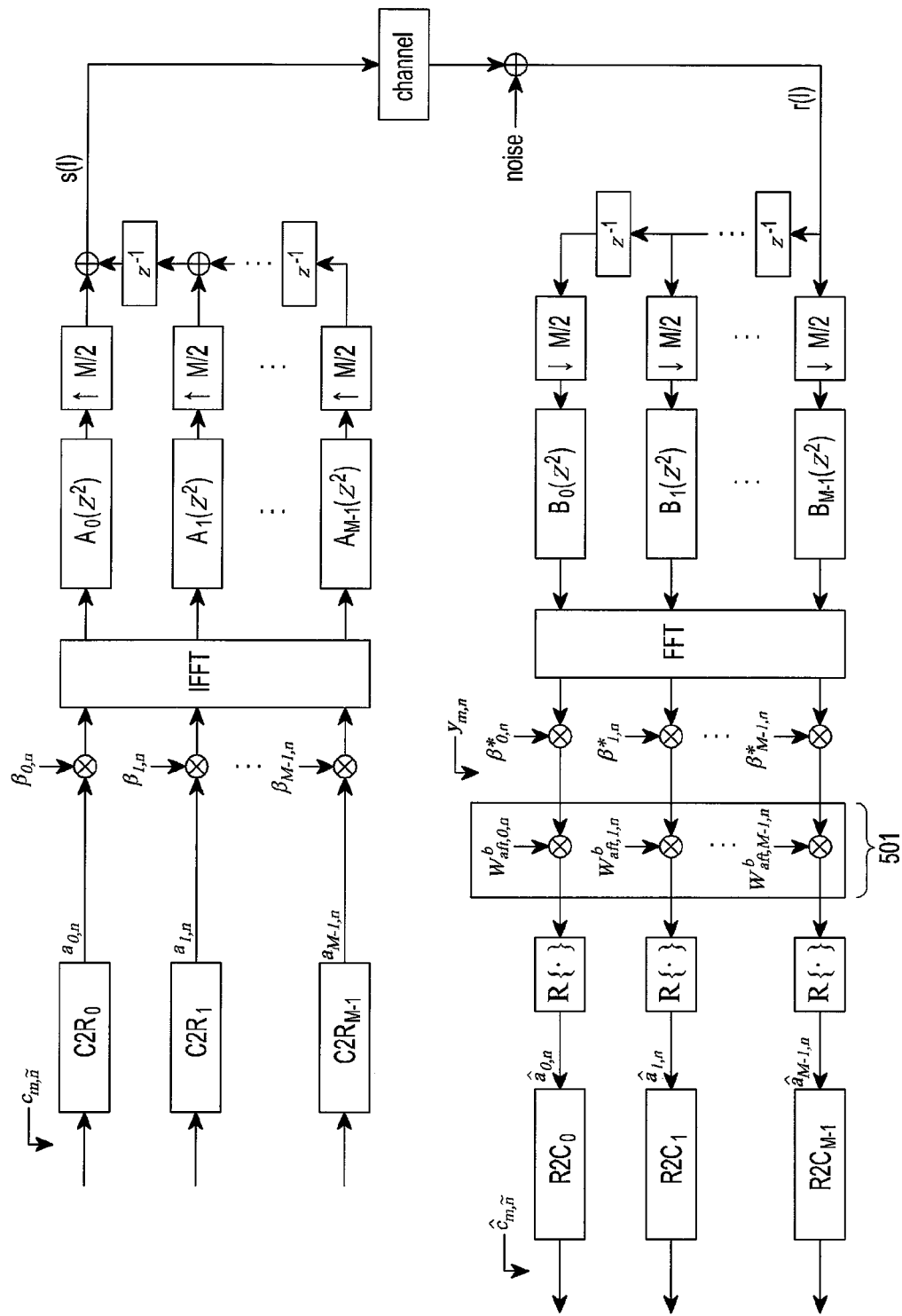
FIG. 5 is a schematic diagram illustrating transmission and receiving of OQAM signals without pre-equalization according to the first embodiment of the present disclosure.

Certainly, performance of the pre-equalization can be ensured if the channel estimation is relatively accurate. When the network load is relatively low, in order to guarantee quality of service (QoS) of each user, the network can be configured as NEB-based FBMC/OQAM signal transmission without pre-equalization (scheduling option B). At this time, the transmission of the OQAM signals is as shown in FIG. 5. Compared with FIG. 4, FIG. 5 lacks a pre-equalization module and has an additional post-equalization module as denoted by 501. The signals transmitted by the transmitter are in the form of formula (11). A shown in FIG. 2B, since the NEB transmission manner is adopted for users, there is no overlap between different users. Therefore, the problem whether channels of different users meet the formula (7) needs not to be considered. But for a single user, overlapping signals on its burst meets the condition of formula (7), therefore the receiver of each user can reconstruct the transmitted signals by performing equalization to merely the output $y_{m,n}$ of its own synthesis filter bank according to formula (8) which takes the output $y_{m,n}$ on the (m0, n0) as an example. Then module 501 of the transmitter merely needs to generate the equalization coefficients according to the estimated channel $\hat{H}_{m,n}$. At this time, the post-equalization manner is conventional channel equalization, e.g., Minimum Mean Square Error (MMSE) equalization or matched filter equalization, etc. Take the matched filter equalization as an example, it is defined that $$W_{aft,(m,n)}^b = \frac{\hat{H}_{m,n}^*}{\|\hat{H}_{m,n}\|^2},$$

then $y_{m,n}$ is equalized according to the coefficients, the transmitted signals can be reconstructed after a real part obtaining operation, i.e., $\Re\{W_{aft,(m,n)}^b y_{m,n}\} \propto \hat{a}_{m,n}$.

In view of the above embodiment, the OQAM signal transmission solution with configurable pre-equalization provided by the embodiment of the present disclosure makes the network scheduling flexible. It ensures spectrum efficiency as much as possible under heavy network load, and can become ensuring QoS of users as much as possible under low network load. In the case that the burst is not long, e.g., the burst in this embodiment is 0.4 ms, the length of the tail is about 0.1167 ms. The occupation ratio is very high. If it is desired to avoid overlapping of the tails completely, there can be a large spectrum efficiency loss. It was once regarded that FBMC system is not applicable for transmission based on short burst. This technical prejudice can be removed completely by pre-equalization. Therefore, application scope of FBMC/OQAM is further expanded.

Embodiment 2

In this embodiment, a Frequency Division Duplex (FDD) FBMC/OQAM system is considered. Similar as embodiment 1, there are also two kinds of bursts, EB and NEB. Parameters are configured similarly as in embodiment 1. In this embodiment, uplink transmission scheduling options of the scheduler include two options as shown in Table 2.

TABLE 2

| Scheduling options | Transmitter | Receiver |
| --- | --- | --- |
| Option C: the frequency bands of the scheduled multiple users are overlapping, bursts of the multiple users are time-division multiplexed in consecutive manner. This option is applicable for situations with heavy access network load and limited resources. | The pre-equalization is enabled. Equalization is performed to merely phase; EB is adopted to transmit data; and pre-equalization coefficients are generated according to time-domain channel phase indicator obtained from a feedback channel. | The post-equalization is enabled. Equalization is performed to merely amplitude. |
| Option D: the frequency bands of the scheduled multiple users are overlapping, but the bursts of the users are time-division multiplexed in non-consecutive manner. NEB is adopted. This option is applicable for situations with low access network load and enough resources. | The pre-equalization is disabled; data are transmitted via EB manner. | The post-equalization is enabled. Conventional equalization manner is adopted. Both the amplitude and the phase need to be equalized. |

In this embodiment, suppose that the transmitter can perform beam forming via a plurality of transmission antennas to make the transmitted wave beam have a better directionality, such that a path in a boresight direction has the highest energy and most of the energy is concentrated on this path. When the receiver receives this highest energy path, the channel impulse response (time domain) estimated by the receiver can be simply expressed by $h(t)=\|h\|\vec{h}$, wherein $\|h\|$ (norm) denotes amplitude, $\vec{h}=e^{j\theta}$ denotes phase variation coefficients brought out by propagation delay. The feedback channel phase indicator $\hat{\theta}$ obtained by the receiver from the feedback channel is a quantization of $\theta$ in $\vec{h}$, transmitted on the feedback channel via limited bits. For example, for a channel direction of 360 degree, 6 bits and 8 bits can represent channel direction information with granularity of 5.625 degree and 1.5 degree, which is enough for space resolution of most beam forming. Even if the highest energy path has a reflection path, suppose that there is receiving beam forming, multiple received main paths can be equivalent to a path of one direction, and therefore can still be simply formulated by $h(t)=\|h\|\vec{h}$.

If the pre-equalization is configured as enabled (scheduling option C), the transmission and receiving of the baseband signal are respectively as follows.

The transmitter knows from scheduling control signaling transmitted by the network scheduler that signals to be transmitted by the transmitter require pre-equalization and the pre-equalization is performed merely to phase, signals are to be transmitted via EB structure.

According to the indication of the network scheduler, the transmitter obtains $\vec{h}=e^{j\hat{\theta}}$ (time domain) via quantified $\hat{\theta}$ fed back by the receiver from the feedback channel. The transmitter converts the channel phase information $\vec{h}$ into frequency phase response coefficients $\vec{H}_{m,n}$ on channel (m,n). Hereinafter, discrete Fourier transform (DFT) is used to denote frequency domain conversion. Note: to be equivalent, the frequency phase response of the channel can be fed back directly via the feedback channel to generate $\vec{H}_{m,n}$. Further, the feedback channel can be a part of the conventional uplink scheduling request, i.e., a newly-added phase indication bit field. It is also possible to configure a new downlink feedback channel to enable the base station to feed back the channel phase indicator to the terminal.

Figure 6:
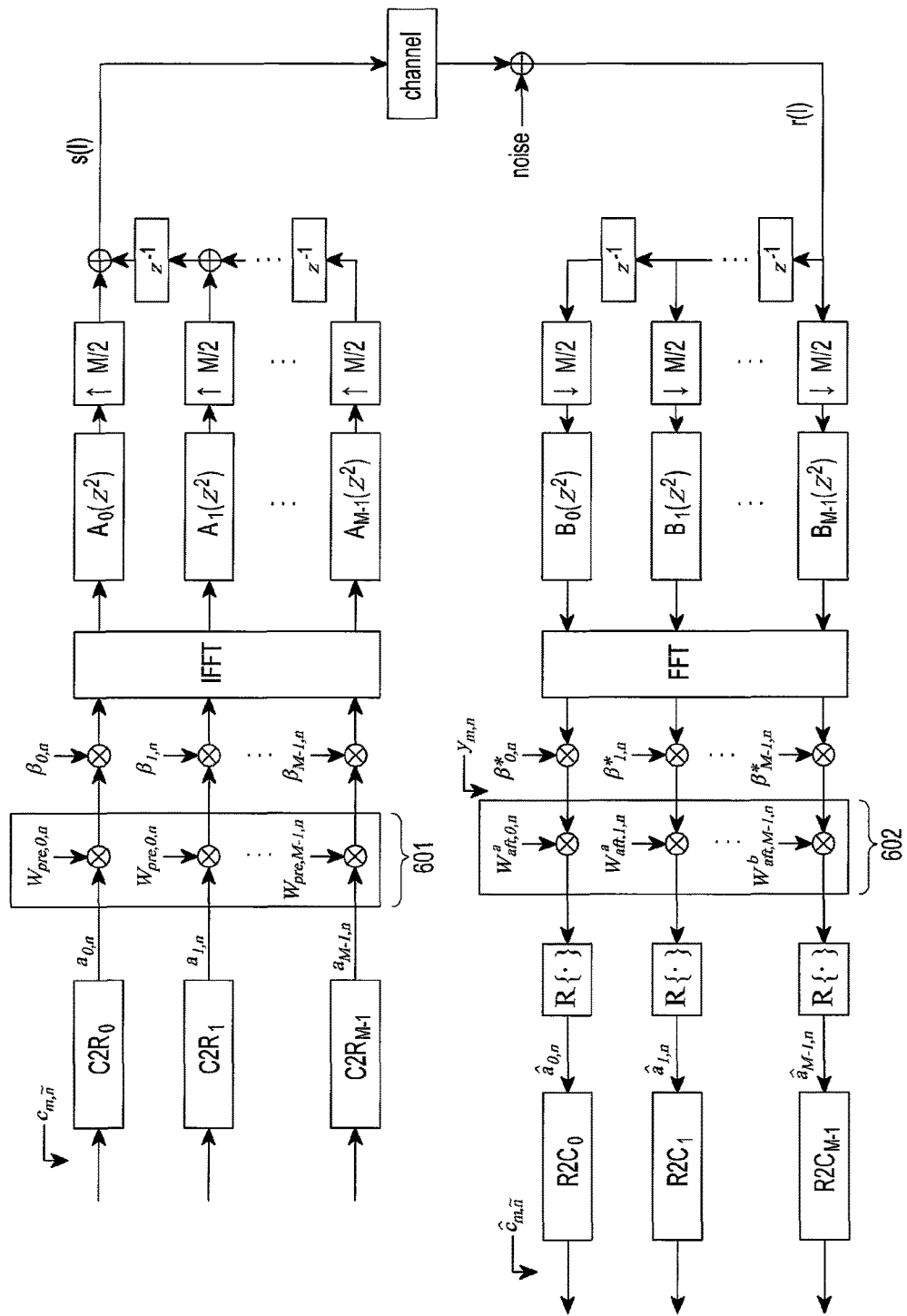
FIG. 6 is a schematic diagram illustrating transmission and receiving of pre-equalized OQAM signals according to a second embodiment of the present disclosure.

The transmitter generates frequency-domain pre-equalization coefficients $W_{pre}$ according to $\vec{H}_{m,n}$, and performs pre-equalization to the transmission signals and then performs OQAM modulation. FIG. 6 is a schematic diagram showing the transmission and receiving of the pre-equalized OQAM signal provided by an embodiment of the present disclosure. Compared with FIG. 4, the equalization module 601 generates the pre-equalization coefficients via a different manner. At the same time, a post-equalization module 602 is added. Other modules are similar as those corresponding modules in FIG. 4. The pre-equalized OQAM signals generated by the transmitter and the pre-equalization coefficients generated by the module 601 can be denoted respectively by formula (12) in embodiment 1 and formula (16):

$$W_{pre}=\vec{H}_{m,n}*DFT*(\vec{h}) \tag{16}$$

The OQAM signals r(l) received by the receiver via the channel can be denoted by formula (17):

$$r(l) = \sum_{n \in Z}\sum_{m=0}^{M-1} H_{m,n} W_{pre,(m,n)} a_{m,n} g_{m,n}[l] + n(l) \tag{17}$$

$$= \sum_{n \in Z}\sum_{m=0}^{M-1} \frac{H_{m,n}\hat{\vec{H}}_{m,n}^{*}}{\hat{H}} a_{m,n} g_{m,n}[l] + n(l)$$

According to formula (17), if there is a main path on which energy is highly concentrated, and if the estimation error and the quantification error of the channel direction information are within a certain range, the estimated channel direction and the practical channel direction are approximate, i.e., their phases are approximate. Then, the composited equivalent channel frequency response is tends to be a real number, i.e., the imaginary part is very small and can be ignored, $\hat{H}=W_{pre}H\approx\|H_{m,n}\|$. The receiver de-modulates r(l). Take the output $y_{m0,n0}$ on channel) (m0, n0) as an example, it is known that $y_{m,n}$ of the synthesized filter bank approximately meets real field orthogonality, as shown in formula (18). The second item in the formula can be regarded as an imaginary.

$$y_{m0,n0} = \tag{18}$$

$$\langle r(l) \mid g_{m,n}\rangle = \|H_{m0,n0}\|a_{m0,n0} + \underbrace{\sum_{\substack{n \\ (m,n)\neq(m0,n0)}}\sum_{m=0}^{M-1} \|H_{m,n}\|a_{m,n}\langle g\rangle_{m,n}^{m0,n0} + \eta_0}_{imaginary}$$

The receiver knows that the transmitter performs the pre-equalization merely to the phase. Therefore, the module 602 of the receiver performs post-equalization to $y_{m,n}$ as shown in formula (18) according to the composited equivalent channel frequency response, the receiver directly estimates through receiving a reference signal which is pre-equalized and used for channel estimation to obtain the equivalent channel frequency response $\hat{H} \approx \|H_{m,n}\|$, or the receiver obtains $\hat{H}$ through receiving a reference signal which is not pre-equalized and the receiver knows the $W_{pre}$ adopted by the transmitter, and therefore knows $\hat{H} \approx W_{pre}\hat{H} \approx \|H_{m,n}\|$ indirectly, i.e., generates the post-equalization coefficients $$W^a_{aft,(m,n)} = \frac{1}{\|\hat{H}_{m,n}\|},$$

multiplies with $y_{m,n}$, and then obtains a real part to obtain the transmitted signal:

$$\hat{a}_{m,n} = \Re\left\{\frac{y_{m,n}}{\|\hat{H}_{m,n}\|}\right\} = a_{m,n} + \eta_0, m = 0, \ldots M-1, n \in Z.$$

In view of the above, the pre-equalization and the post-equalization are respectively performed with respect to the phase and amplitude, which reduces required amount of feedback. In addition, through feeding back channel direction information (time domain) instead of directly feeding back frequency-domain channel phase, feedback overload can be further reduced. It is merely required that the transmitter generates the frequency-domain channel phase through Fourier transform, which is not complicated.

If the pre-equalization is configured as disabled (scheduling option D), the processing is similar to those of scheduling option B in embodiment 1 and is not repeated herein.

Embodiment 3

In this embodiment, a Frequency Division Duplex (FDD) FBMC/OQAM system is considered. Similar as embodiment 1, there are also two kinds of bursts, EB and NEB. Parameters are configured similarly as in embodiment 1. In this embodiment, uplink transmission scheduling options of the scheduler include two options as shown in Table 3.

In this embodiment, suppose that the transmitter adopts an omnidirectional transmission antenna and a time-variant multipath channel is passed, the channel impulse response of the channel at time t can be simply expressed by formula (19):

$$h(t, \tau) = \sum_n C_n(t) e^{j(2\pi f_{Dn} + \theta_n)} \delta(\tau - \tau_n); \quad (19)$$

wherein $f_{Dn}$ denotes a doppler frequency shift of the nth path; $\theta_n$ denotes a phase shift brought out by propagation delay of the nth path; $\tau_n$ denotes a relative delay of the nth path with respect to the first arrived path, and $C_n(t)$ denotes a complex gain of the nth path; $\delta$ is a Dirac Delta function. It can be seen from this formula that, for a multipath channel with energy dispersion, it is not realistic to directly feed back the time-domain channel status information to reconstruct the phase information of the channel impulse response and the overhead is too large. However, according to the delay spread of a multi-path channel, the channel can be divided into multiple coherent sub-bands in the frequency domain. We can assume that the channel frequency response within a sub-band is nearly constant. Thus, the channel frequency phase response can be quantified per sub-band basis from the view of the coherent bandwidth in frequency domain. For each sub-band one phase indicator can be fed back. The phase indicator is used for reconstructing the frequency phase response coefficients $\vec{H}_{m,n}$ of each subcarrier within the sub-band. According to the channel frequency phase response coefficients reconstructed based on the sub-bands, the pre-equalization coefficients $W_{pre}=\vec{H}_{m,n}^*$ used on the allocated bandwidth can be generated. For example, the channel impulse response of the multipath channel can be converted into the frequency domain, simply expressed by formula (20):

$$H(f) = \|H(f)\| e^{j\varphi(f)}; \quad (20)$$

wherein $\|H(f)\|$ denotes frequency amplitude response (also referred to as amplitude frequency response), $\varphi(f)$ denotes frequency phase response (also referred to as phase frequency response), $e^{j\varphi(f)}$ denotes corresponding complex frequency phase response coefficients. According to channel coherent bandwidth, the frequency phase response can be divided into K segments $\varphi(f_k)$, which correspond to a set of sub-bands. For each frequency segment $f_k$, it is regarded that the $\varphi(f_k)$ is changed linearly. Therefore, a quantified phase

TABLE 3

| Scheduling options | Transmitter | Receiver |
| --- | --- | --- |
| Option E: the frequency bands of the scheduled multiple users are overlapping, bursts of the multiple users are time-division multiplexed in consecutive manner. This option is applicable for situations with heavy access network load and limited resources. | The pre-equalization is enabled. Pre-equalization is performed to merely phase; EB is adopted to transmit data; and pre-equalization coefficients are generated according to frequency-domain channel phase indication obtained from a feedback channel. | The post-equalization is enabled. Post-equalization is performed to merely amplitude. |
| Option F: the frequency bands of the scheduled multiple users are overlapping, but the bursts of the users are time-division multiplexed in non-consecutive manner. NEB is adopted. This option is applicable for situations with low access network load and enough resources. | The pre-equalization is disabled; data are transmitted via EB manner. | The post-equalization is enabled. Conventional equalization manner is adopted. Both the amplitude and the phase need to be equalized. | indicator $\hat{\varphi}(k)$ can be utilized to perform limited feedback. According to the phase indicator, the frequency phase response coefficients $\hat{H}^{(k)}_{m,n} = e^{j\hat{\varphi}(f_k)}$, $m \in f_k$ of each subcarrier in the frequency segment $f_k$ can be reconstructed, the coefficients are used for generating the pre-equalization coefficients $W_{pre}$.

For example, if the pre-equalization is configured as enabled (scheduling option E), the transmission and reception of the baseband signal are respectively as follows.

The transmitter knows from scheduling control signaling transmitted by the network scheduler that signals to be transmitted by the transmitter require pre-equalization and the pre-equalization is performed merely to phase, signals are to be transmitted via EB structure.

According to the indication of the network scheduler, the transmitter obtains the sub-band based phase indicator $\hat{\varphi}(k)$ from the feedback channel. Based on the sub-bands included in the allocated bandwidth, the transmitter reconstructs the frequency phase response coefficients $\hat{H}^{(k)}_{m,n} = e^{j\hat{\varphi}(f_k)}$ according to the sub-bands, and then obtains frequency phase response coefficients $\hat{H}^{(k)}_{m,n} = e^{j\hat{\varphi}(f_k)}$ of all subcarriers of the allocated bandwidth. Further, the feedback channel can be a part of the conventional uplink scheduling request, i.e., a newly-added phase indication bit field. It is also possible to configure a new downlink feedback channel to enable the base station to feed back the channel phase indication to the terminal.

The transmitter generates frequency-domain pre-equalization coefficients $W_{pre}$ e.g. $W_{pre} = \hat{H}_{m,n}^*$ according to $\hat{H}_{m,n}$, and performs pre-equalization to the transmission signals and then performs OQAM modulation. The OQAM signals r(l) received by the receiver via the channel can still be denoted by formula (17):

$$r(l) = \sum_{n \in Z} \sum_{m=0}^{M-1} H_{m,n} W_{pre,(m,n)} a_{m,n} g_{m,n}[l] + n(l) \quad (17)$$

$$= \sum_{n \in Z} \sum_{m=0}^{M-1} \underbrace{H_{m,n} \hat{H}^*_{m,n}}_{\tilde{H}} a_{m,n} g_{m,n}[l] + n(l)$$

In terms of the condition of formula (7) and formula (17), as long as the phase response coefficients of the composited equivalent channel frequency response of the pre-equalization coefficients and the channel frequency response among adjacent symbols approach the same, interferences resulted from damage of OQAM real field orthogonality by multipath channel can be reduced, i.e., $\tilde{H} = W_{pre} H = \|H_{m,n}\| e^{j(\varphi(f) - \hat{\varphi}(f))} \approx \|H_{m,n}\| e^{j\Delta_{m,n}}$, wherein $\Delta_{m,n}$ is a value with small difference among different symbols. The receiver de-modulates r(l), taking the output $y_{m0,n0}$ on channel (m0, n0) as an example, as shown in formula (21):

$$y_{m0,n0} = \langle r(l) | g_{m,n} \rangle = \tilde{H}_{m0,n0} a_{m0,n0} + \underbrace{\sum_{n} \sum_{m=0}^{M-1}}_{(m,n) \neq (m0,n0)} \tilde{H}_{m,n} a_{m,n} \langle g \rangle_{m,n}^{m0,n0} + \eta_0 \quad (21)$$

$$\underbrace{}_{imaginary}$$

Based on the premise of $\tilde{H} = W_{pre} H = \|H_{m,n}\| e^{j(\varphi(f) - \hat{\varphi}(f))} \approx \|H_{m,n}\| e^{j\Delta_{m,n}}$, according to formula (6), interferences between adjacent symbols can be further reduced through post-equalization. The formula (21) can be approximately reformulated as formula (22):

$$y_{m0,n0} = \langle r(l) | g_{m,n} \rangle \quad (22)$$

$$= \tilde{H}_{m0,n0} a_{m0,n0} + \underbrace{\sum_{(p,q) \in \Omega_{\Delta m, \Delta n}} \tilde{H}_{p,q} a_{p,q} \langle g \rangle_{p,q}^{m0,n0}}_{\xi_{m0,n0}, \text{main ICI and ISI}} +$$

$$\underbrace{\sum_{(p',q') \notin \Omega_{\Delta m, \Delta n}} \tilde{H}_{p',q'} a_{p',q'} \langle g \rangle_{p',q'}^{m0,n0}}_{J_{m0,n0}, \text{may be ignored}} + \eta_0$$

$$\approx \|H_{m0,n0}\| e^{j\Delta_{m0,n0}} \left( a_{m0,n0} + \sum_{(p,q) \in \Omega_{\Delta m, \Delta n}} a_{p,q} \langle g \rangle_{p,q}^{m0,n0} \right) + \eta_0$$

Obviously, the receiver knows that the transmitter performs the pre-equalization merely to the phase. Therefore, the module 602 of the receiver is able to retrieve the transmitted data through performing post-equalization to $y_{m,n}$ as shown in formula (22) according to the estimated equivalent channel frequency response. The receiver can by direct-estimation obtain the equivalent channel frequency response $\hat{\tilde{H}} \approx \|H_{m,n}\| e^{j\Delta_{m,n}}$ through receiving a reference signal which is pre-equalized and used for channel estimation, so as to generate the post-equalization coefficients $$W^a_{dft,(m,n)} = \frac{1}{\hat{\tilde{H}}_{m,n}}$$

for the post-equalization operation. After post-equalization i.e. multiplies the $$W^a_{dft,(m,n)} = \frac{1}{\hat{\tilde{H}}_{m,n}}$$

with $y_{m,n}$, retrieves the transmitted signal $$\hat{a}_{m,n} \approx \Re \left\{ \frac{y_{m,n}}{\hat{\tilde{H}}_{m,n}} \right\} \approx \Re \left\{ \frac{y_{m,n}}{\|H_{m,n}\| e^{j\Delta_{m,n}}} \right\} \approx a_{m,n} + \eta_0,$$

m=0, ... M−1, n∈Z can be retrieved by real part extraction operation.

If the pre-equalization is configured as disabled (scheduling option F), the processing is similar to those of scheduling option B in embodiment 1 and is not repeated herein.

Based on the above embodiments, the present disclosure provides a signal transmission method based on filter band, including obtaining, by a transmitter, pre-equalization information, wherein the pre-equalization configuration information indicates whether pre-equalization is enabled, if the pre-equalization configuration information indicates that the pre-equalization is enabled, generating by the transmitter pre-equalization coefficients according to a pre-equalization manner, and performing pre-equalization operation to transmission signals according to the pre-equalization coefficients, and performing modulation based on filter bank.

In accordance with the above method, the present disclosure provides a transmitter based on filter bank, including: a control signaling processing module, a pre-equalization switch, an information source, a pre-equalization coefficients generating module and a transmission synthesis filter bank, wherein the control signaling processing module is to obtain pre-equalization configuration information, wherein the pre-equalization configuration information indicates whether pre-equalization is enabled, if the pre-equalization configuration information indicates that pre-equalization is enabled, the control signaling processing module controls the pre-equalization switch to connect with the pre-equalization coefficients generating module, such that real number signals generated by the information source are pre-equalized according to the pre-equalization coefficients generated by the pre-equalization coefficients generating module before being modulated by the transmission synthesis filter bank, if the pre-equalization configuration information indicates that the pre-equalization is disabled, the control signaling processing module controls the pre-equalization switch to connect with the transmission synthesis filter bank, such that real number signals generated by the information source are directly modulated by the transmission synthesis filter bank.

Based on the above embodiments, the present disclosure provides a signal receiving method based on filter bank, including determining, by a receiver, whether post-equalization is to be performed to demodulated signals based on filter bank according to pre-equalization configuration information indicated to a transmitter; wherein the pre-equalization configuration information indicates whether pre-equalization is enabled, if the pre-equalization configuration information indicates that the pre-equalization is enabled, and a pre-equalization manner is performing pre-equalization to both amplitude and phase, the receiver does not performing post-equalization to the demodulated signals based on filter bank, if the pre-equalization configuration information indicates that the pre-equalization is enabled, and a pre-equalization manner is performing pre-equalization to merely phase, performing by the receiver a post-equalization to the demodulated signals based on filter bank according to a composited equivalent channel frequency response of the pre-equalization coefficients and the channel frequency response, if the pre-equalization configuration information indicates that the pre-equalization is disabled, performing by the receiver, amplitude and phase post-equalization to the demodulated signals based on filter bank according to an estimated channel frequency response.

In accordance with the above method, the present disclosure provides a receiver based on filter bank, comprising a receiving analysis filter bank, a post-equalization switch, a post-equalization coefficients generating module, and a real part obtaining module, wherein the post-equalization switch is to determine whether post-equalization is to be performed to demodulated signals of the receiving analysis filter bank according to pre-equalization configuration information indicated to a transmitter, wherein the pre-equalization configuration information indicates whether pre-equalization is enabled, if the pre-equalization configuration information indicates that pre-equalization is enabled, and a pre-equalization manner is to perform pre-equalization to both amplitude and phase, the post-equalization switch connects to the receiving analysis filter bank and the real part obtaining module, if the pre-equalization configuration information indicates that pre-equalization is enabled, and a pre-equalization manner is performing pre-equalization to merely phase, the post-equalization switch transmits the pre-equalization manner to the post-equalization coefficients generating module, and connects to the receiving analysis filter bank and the post-equalization coefficients generating module, such that the post-equalization coefficients generating module generates post-equalization coefficients, and performs amplitude post-equalization to demodulated signals of the receiving analysis filter bank according to a composited equivalent channel frequency response of the pre-equalization coefficients and the channel frequency response before transmitting to the real part obtaining module, if the pre-equalization configuration information indicates that pre-equalization is disabled, the post-equalization switch connects to the receiving analysis filter bank and the post-equalization coefficients generating module, the post-equalization coefficients generating module generates post-equalization coefficients and performs amplitude and phase post-equalization to demodulated signals of the receiving analysis filter bank according to an estimated channel frequency response before transmitting to the real part obtaining module.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A signal transmission method based on a filter bank, comprising:
   receiving, by an electronic device, a scheduling control signaling including a pre-equalization configuration information indicating whether pre-equalization is enabled, from a network;
   obtaining, by the electronic device, the pre-equalization configuration information from the scheduling control signaling;
   if the pre-equalization configuration information indicates that the pre-equalization is enabled, generating, by the electronic device, pre-equalization coefficients, performing pre-equalization operation to transmission signals according to the pre-equalization coefficients, and performing modulation based on the filter bank; and
   if the pre-equalization configuration information indicates that the pre-equalization is disabled, performing, by the electronic device, modulating to the transmission signals without pre-equalization, based on the filter bank.

2. The signal transmission method of claim 1, further comprising:
   obtaining, by the electronic device from the scheduling control signaling, information of subframe type adopted when the pre-equalization is enabled or disabled,
   wherein the information of subframe type indicates number of symbols transmitted in a subframe and transmission timing of a first symbol.

3. The signal transmission method of claim 1, wherein generating the pre-equalization coefficients comprises:
   generating the pre-equalization coefficients according to a pre-equalization manner, wherein the pre-equalization manner is pre-defined, or an indication of the pre-equalization manner is contained in the pre-equalization configuration information.

4. The signal transmission method of claim 3, wherein the pre-equalization manner comprises:
   performing pre-equalization to both amplitude and phase, or performing pre-equalization to the phase.

5. The signal transmission method of claim 4, wherein if the pre-equalization manner comprises performing pre-equalization to both amplitude and phase, generating the pre-equalization coefficients according to the pre-equalization manner comprises:

generating the pre-equalization coefficients according to channel status information and the pre-equalization manner, wherein a composite equivalent channel frequency response of the pre-equalization coefficients and a channel frequency response is a real number or has an imaginary part approaches to 0, and modulus of the equivalent channel frequency response approximates to 1.

6. The signal transmission method of claim 5, wherein the channel status information is obtained from channel reciprocity.

7. The signal transmission method of claim 4, wherein if the pre-equalization manner comprises performing pre-equalization to the phase, generating the pre-equalization coefficients according to the pre-equalization manner comprises:

generating the pre-equalization coefficients according to channel status information and the pre-equalization manner, wherein a composite equivalent channel frequency response of the pre-equalization coefficients and a channel frequency response is a real number or has an imaginary part approaches to 0, and modulus of the equivalent channel frequency response approximates to modulus of the channel frequency response.

8. The signal transmission method of claim 4, wherein if the pre-equalization manner comprises performing pre-equalization to the phase, generating the pre-equalization coefficients according to the pre-equalization manner comprises:

obtaining a phase indicator according to a feedback from a receiver; and generating the pre-equalization coefficients according to the obtained phase indicator.

9. The signal transmission method of claim 8, wherein a quantified phase information of channel frequency response is obtained according to the phase indicator, frequency phase response coefficients on an allocated bandwidth are generated according to the phase information, and the frequency phase response coefficients is taken as frequency-domain pre-equalization coefficients.

10. The signal transmission method of claim 9, further comprising:

dividing frequency domain into one or more sub-bands, wherein the phase indicator is based on a sub-band, a number of the one or more sub-bands is larger than or equal to 1, wherein the frequency-domain pre-equalization coefficients on the allocated bandwidth is generated according to a corresponding relationship between the phase indication and the one or more sub-bands.

11. The signal transmission method of claim 8, wherein a quantified phase information of channel impulse response is obtained according to the phase indicator, the phase information is converted into corresponding frequency phase response coefficients, and the frequency phase response coefficients are taken as frequency-domain pre-equalization coefficients.

12. The signal transmission method of claim 11, wherein the quantified phase information of channel impulse response is phase information of a highest energy path in a multipath channel, or is phase information of an average of phases of X highest energy paths in the multipath channel, wherein X is larger than 1.

13. The signal transmission method of claim 8, wherein the feedback is obtained from phase indication bit field added in an uplink scheduling grant or from a dedicated feedback channel.

14. A signal receiving method based on a filter bank, comprising:

determining, by an electronic device, whether post-equalization is to be performed to demodulated signals based on the filter bank according to pre-equalization configuration information, wherein the pre-equalization configuration information indicates whether pre-equalization is enabled or disabled;

if the pre-equalization configuration information indicates that the pre-equalization is enabled, performing, by the electronic device, the post-equalization to the demodulated signals based on the filter bank according to a composite equivalent channel frequency response of pre-equalization coefficients and a channel frequency response; and if the pre-equalization configuration information indicates that the pre-equalization is disabled, performing, by the electronic device, amplitude and phase post-equalization to the demodulated signals based on the filter bank according to an estimated channel frequency response.

15. The method of claim 14, wherein performing the post-equalization according to the composited equivalent channel frequency response of the pre-equalization coefficients and the channel frequency response comprises:

directly estimating the composite equivalent channel frequency response of the pre-equalization coefficients and the channel frequency response through receiving a reference signal which is pre-equalized and used for channel estimation; or performing a channel estimation to a reference signal which is not pre-equalized and indirectly estimating the composite equivalent channel frequency response of the pre-equalization coefficients and the channel frequency response according to a pre-equalization manner adopted by a transmitter, wherein the composite equivalent channel frequency response is used for performing the post-equalization to the demodulated signals based on the filter bank.

16. The method of claim 15, wherein the pre-equalization manner is pre-defined, or an indication of the pre-equalization manner is contained in the pre-equalization configuration information.

17. An electronic device for transmitting a signal based on a filter bank, comprising:

a non-transitory computer-readable medium; and a processor, when executing instructions stored in the non-transitory computer-readable medium, configured to:

receive a scheduling control signaling including a pre-equalization configuration information indicating whether pre-equalization is enabled, from a network, obtain pre-equalization configuration information from the scheduling control signaling, if the pre-equalization configuration information indicates that pre-equalization is enabled, generate pre-equalization coefficients, perform pre-equalization operation to transmission signals according to the pre-equalization coefficients, and perform modulation based on the filter bank; and if the pre-equalization configuration information indicates that the pre-equalization is disabled, perform modulation to the transmission signals without the pre-equalization based on the filter bank.

18. The electronic device of claim 17, wherein the pre-equalization configuration information is obtained from a scheduling control signaling.

19. The electronic device of claim 17, wherein the processor is configured to generate the pre-equalization coefficients according to a pre-equalization manner, wherein the pre-equalization manner is pre-defined or an indication of the pre-equalization manner is contained in the pre-equalization configuration information.

20. An electronic device for receiving based on a filter bank, comprising:
   a non-transitory computer-readable medium; and
   a processor, when executing instructions stored in the non-transitory computer-readable medium, configured to:
   determine whether post-equalization is to be performed to demodulated signals based on the filter bank according to pre-equalization configuration information, wherein the pre-equalization configuration information indicates whether pre-equalization is enabled or disabled, and
   if the pre-equalization configuration information indicates that pre-equalization is enabled, perform the post-equalization to the demodulated signals based on the filter bank according to a composite equivalent channel frequency response to pre-equalization coefficients and a channel frequency response,
   if the pre-equalization configuration information indicates that pre-equalization is disabled, perform amplitude and phase post-equalization to the demodulated signals based on the filter bank according to an estimated channel frequency response.

21. The electronic device of claim 20, wherein a pre-equalization manner is pre-defined or an indication of the pre-equalization manner is contained in the pre-equalization configuration information.

* * * * *